United States Patent
Yokota et al.

(10) Patent No.: US 10,992,879 B2
(45) Date of Patent: Apr. 27, 2021

(54) IMAGING SYSTEM WITH MULTIPLE WIDE-ANGLE OPTICAL ELEMENTS ARRANGED ON A STRAIGHT LINE AND MOVABLE ALONG THE STRAIGHT LINE

(71) Applicants: Soichiro Yokota, Kanagawa (JP); Hirokazu Takenaka, Kanagawa (JP); Tamon Sadasue, Kanagawa (JP); Keita Katagiri, Kanagawa (JP)

(72) Inventors: Soichiro Yokota, Kanagawa (JP); Hirokazu Takenaka, Kanagawa (JP); Tamon Sadasue, Kanagawa (JP); Keita Katagiri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/490,820

(22) PCT Filed: Mar. 16, 2018

(86) PCT No.: PCT/JP2018/010399
§ 371 (c)(1),
(2) Date: Sep. 3, 2019

(87) PCT Pub. No.: WO2018/169035
PCT Pub. Date: Sep. 20, 2018

(65) Prior Publication Data
US 2020/0029025 A1    Jan. 23, 2020

(30) Foreign Application Priority Data
Mar. 17, 2017   (JP) .............................. JP2017-053768

(51) Int. Cl.
*H04N 5/247*   (2006.01)
*G06T 7/55*    (2017.01)
(Continued)

(52) U.S. Cl.
CPC ............... *H04N 5/247* (2013.01); *G06T 7/55* (2017.01); *G06T 17/00* (2013.01); *H04N 5/2254* (2013.01); *H04N 13/243* (2018.05)

(58) Field of Classification Search
CPC ........ G02B 13/06; G03B 37/04; G06T 17/00; G06T 7/55; H04N 13/243; H04N 13/282;
(Continued)

(56) References Cited

U.S. PATENT DOCUMENTS

| | | |
|---|---|---|
| 2013/0235149 A1 | 9/2013 | Tanaka et al. |
| 2013/0242040 A1 | 9/2013 | Masuda et al. |

(Continued)

FOREIGN PATENT DOCUMENTS

| | | |
|---|---|---|
| CN | 103548333 A | 1/2014 |
| CN | 104322052 A | 1/2015 |

(Continued)

OTHER PUBLICATIONS

International Search Report and Written Opinion dated May 8, 2018 in PCT/JP2018/010399 filed on Mar. 16, 2018.
(Continued)

*Primary Examiner* — Jessica M Prince
(74) *Attorney, Agent, or Firm* — Oblon, McClelland, Maier & Neustadt, L.L.P.

(57) ABSTRACT

An imaging system includes a plurality of imaging bodies, a moving part, and an imaging control unit. Each of the imaging bodies includes a first optical element that images a range containing a hemisphere that is centered at an optical axis and oriented in a first direction of the optical axis, and a second optical element that images a range containing a hemisphere that is centered at the optical axis and oriented in a second direction opposite to the first direction. The imaging bodies is arranged in a direction orthogonal to the optical axis. The moving part moves the imaging bodies on
(Continued)

a straight line. The imaging control unit is configured to cause the imaging bodies to perform imaging in synchronization with each other, and acquire a taken image from each of the imaging bodies.

8 Claims, 17 Drawing Sheets

(51) Int. Cl.
*H04N 13/243* (2018.01)
*G06T 17/00* (2006.01)
*H04N 5/225* (2006.01)

(58) Field of Classification Search
CPC ............... H04N 5/2254; H04N 5/2258; H04N 5/23238; H04N 5/247
See application file for complete search history.

(56) References Cited

U.S. PATENT DOCUMENTS

| | | |
|---|---|---|
| 2014/0104307 A1 | 4/2014 | Tanaka |
| 2014/0184753 A1* | 7/2014 | Kawamoto .......... H04N 13/211 348/47 |
| 2016/0073095 A1* | 3/2016 | Ogura .................. H04N 13/282 348/50 |
| 2016/0210776 A1* | 7/2016 | Wanner .................... G06T 7/557 |
| 2016/0301912 A1 | 10/2016 | Saitoh et al. |
| 2017/0078653 A1* | 3/2017 | Bi ......................... G06T 3/0062 |
| 2017/0098132 A1 | 4/2017 | Yokota et al. |
| 2017/0177955 A1 | 6/2017 | Yokota et al. |
| 2019/0199995 A1* | 6/2019 | Yip ...................... H04N 13/161 |

FOREIGN PATENT DOCUMENTS

| | | |
|---|---|---|
| CN | 105407256 A | 3/2016 |
| CN | 106097453 A | 11/2016 |
| JP | 11-325895 A | 11/1999 |
| JP | 2005-063012 | 3/2005 |
| JP | 2005-063013 | 3/2005 |
| JP | 4554954 | 7/2010 |
| JP | 5011528 | 6/2012 |
| JP | 2012-198077 | 10/2012 |
| JP | 2013-214952 A | 10/2013 |
| JP | 2013-218278 | 10/2013 |
| JP | 2016-149734 | 8/2016 |
| WO | WO 2012/160777 A1 | 11/2012 |

OTHER PUBLICATIONS

C. Kim, H. Zimmer, et al. "Scene reconstruction from high spatio-angular resolution light fields" SIGGRAPH, 2013.
Richard Szeliski, "Computer Vision—Algorithms and Applications," Nov. 24, 2010, Chapter 4 and Chapter 6.
Combined Chinese Office Action and Search Report dated Aug. 3, 2020 in Patent Application No. 201880018324.4 (with English language translation), 22 pages.
Office Action dated Jan. 26, 2021, in corresponding Japanese Patent Application No. 2017-053768, 3 pages.

* cited by examiner

[Fig. 1]
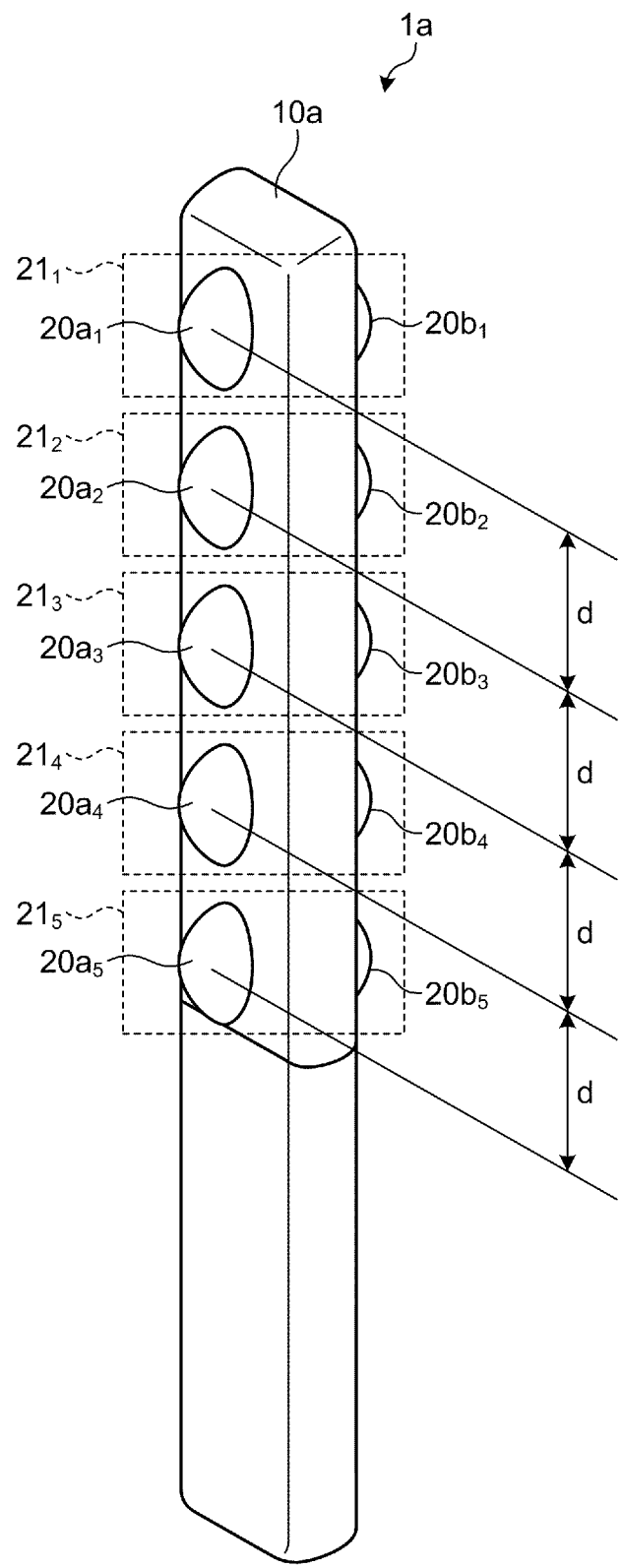

[Fig. 2]
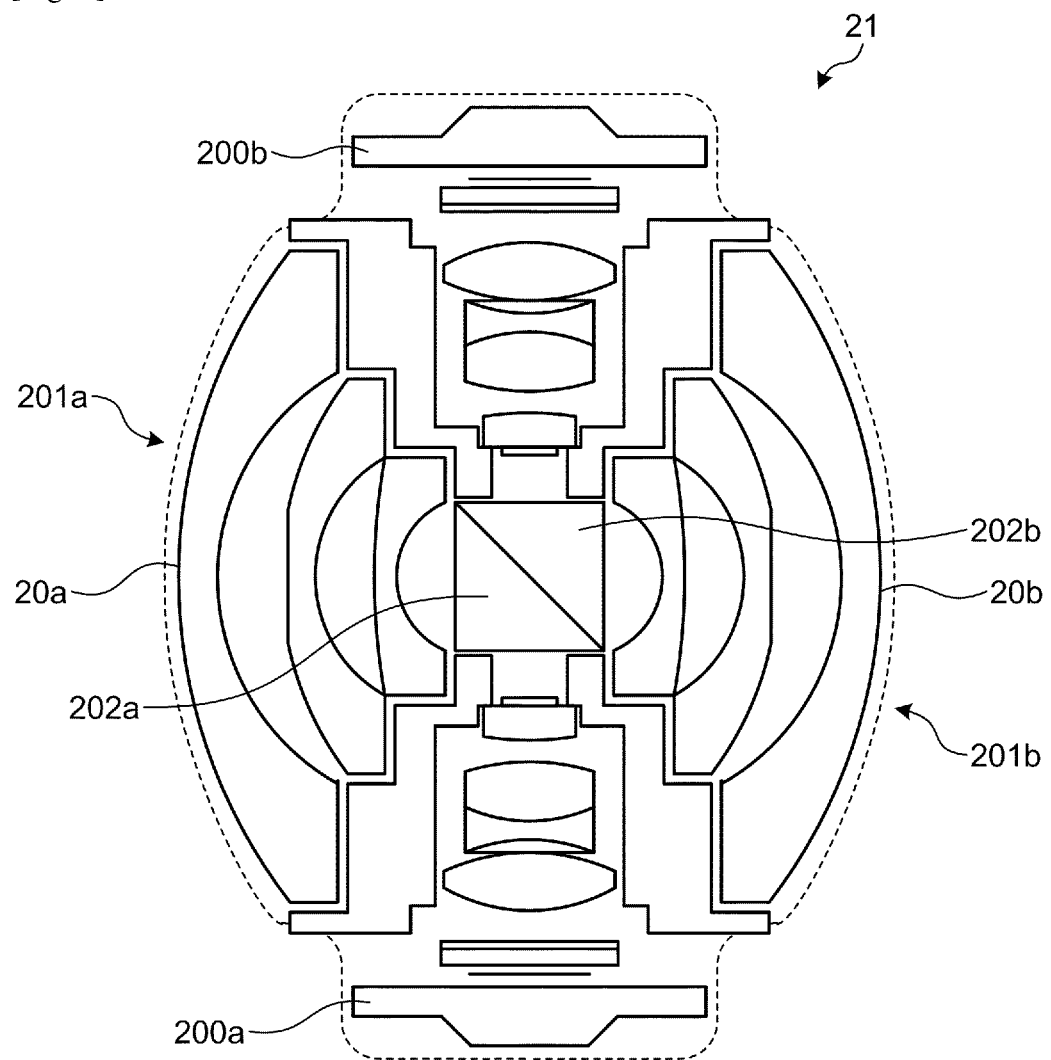

[Fig. 3]
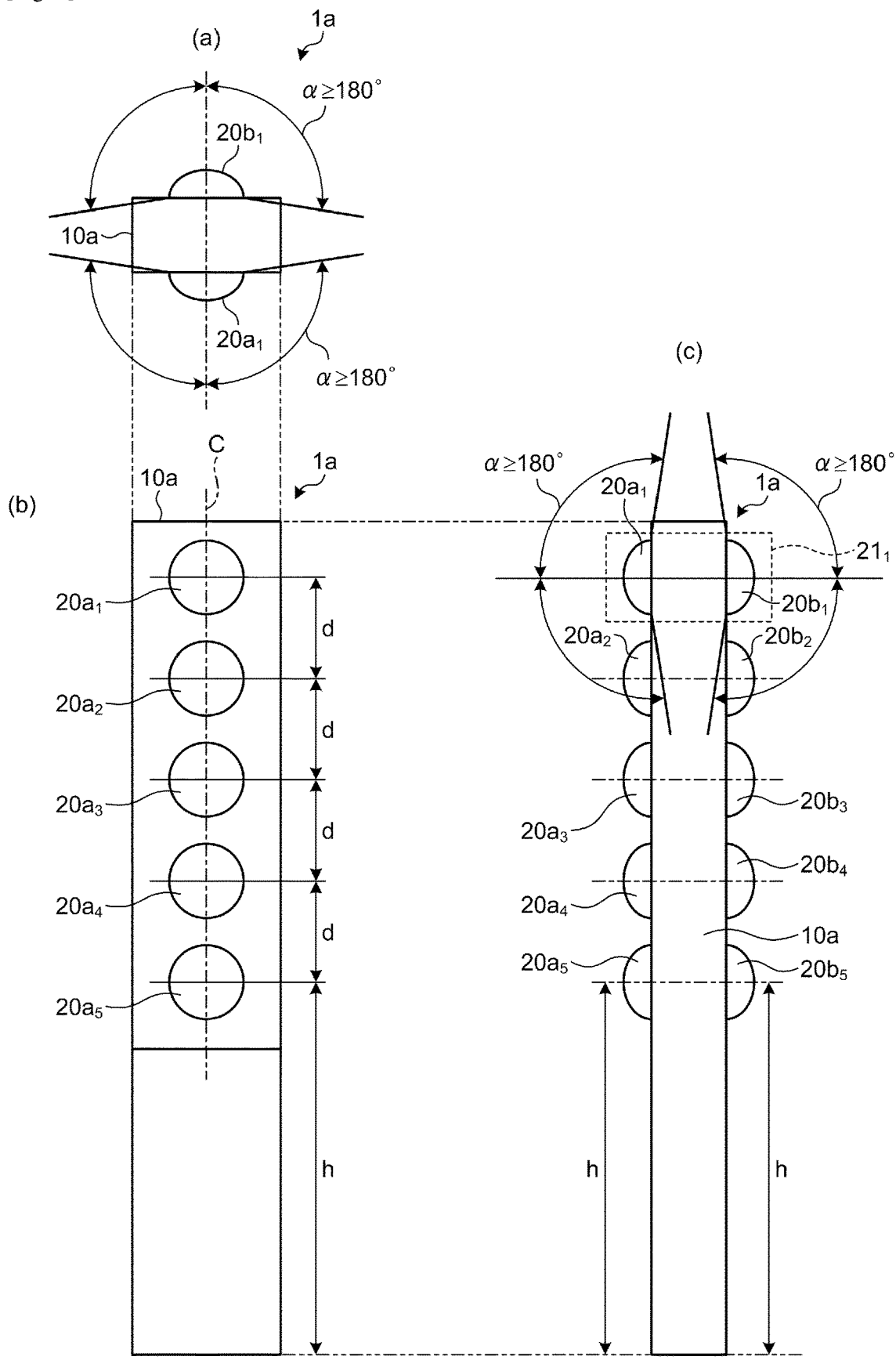

[Fig. 4]
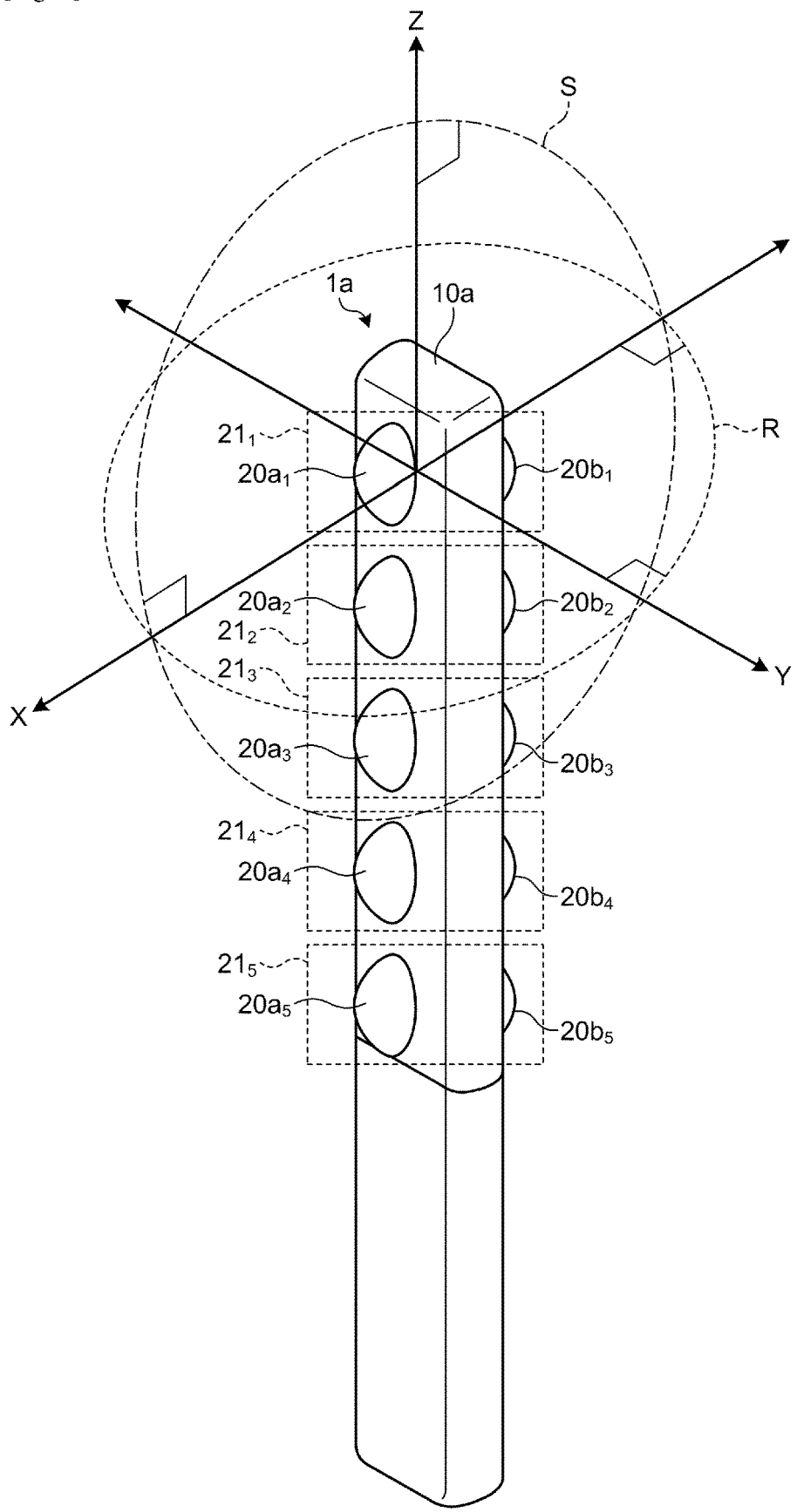

[Fig. 5]
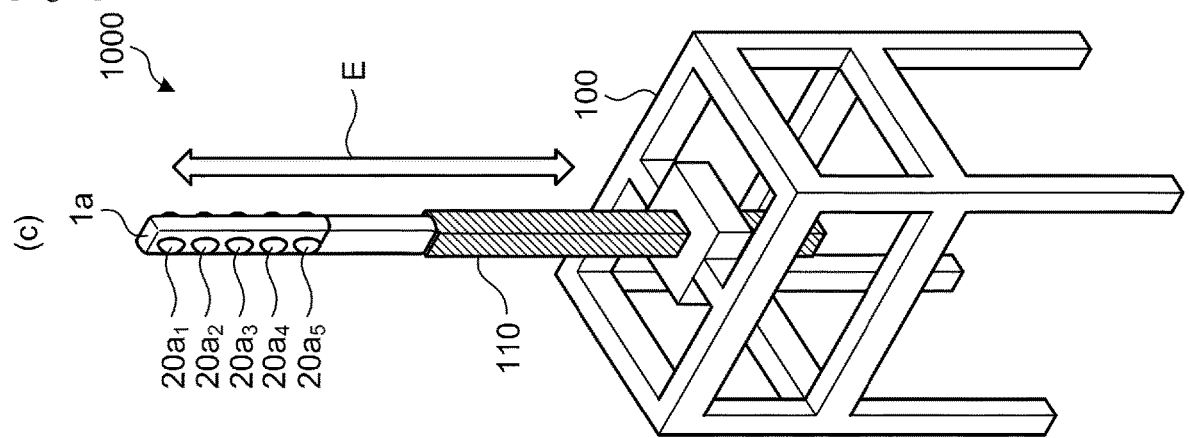
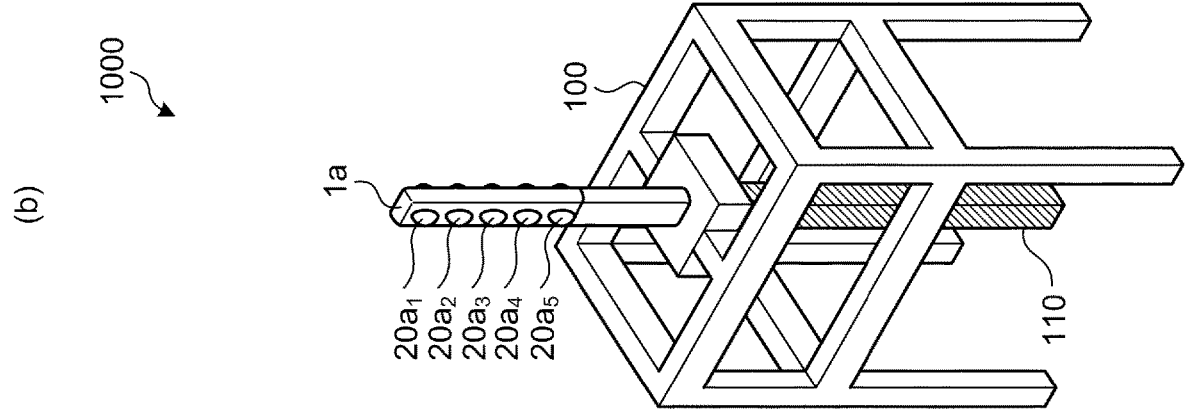
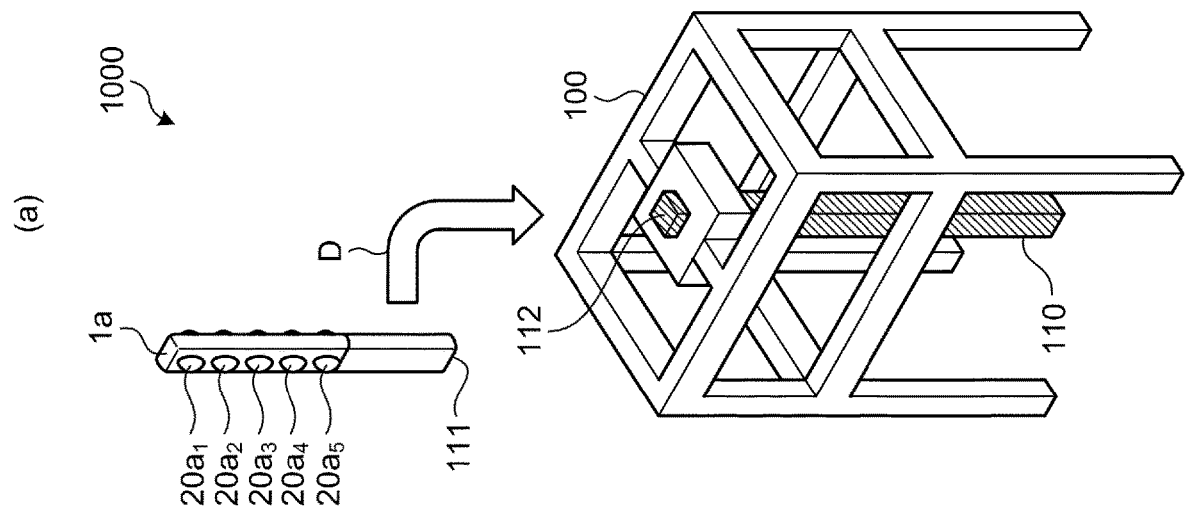

[Fig. 6]
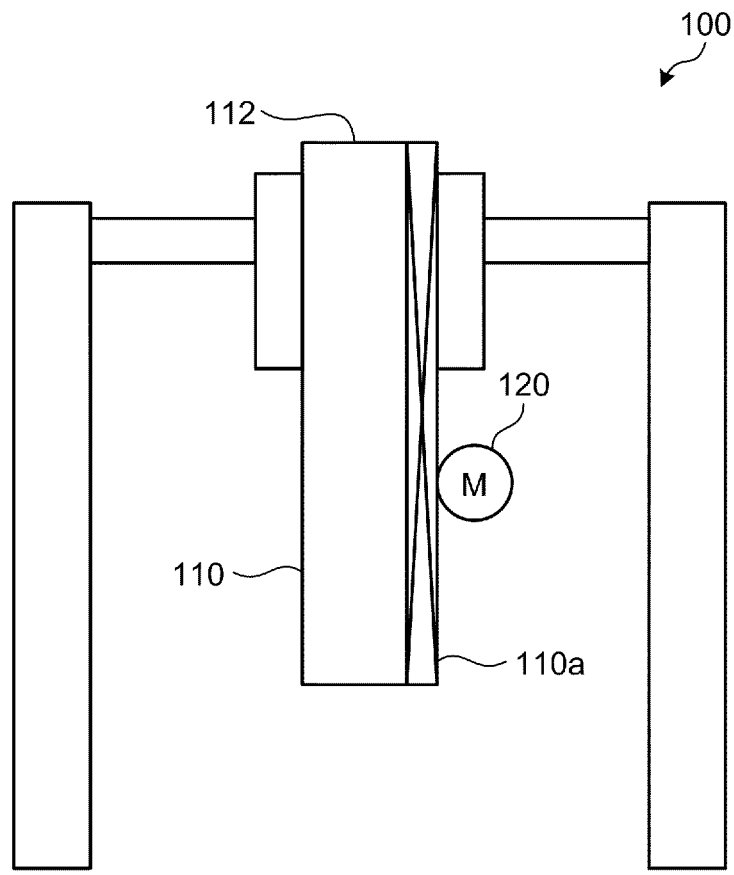
[Fig. 7]
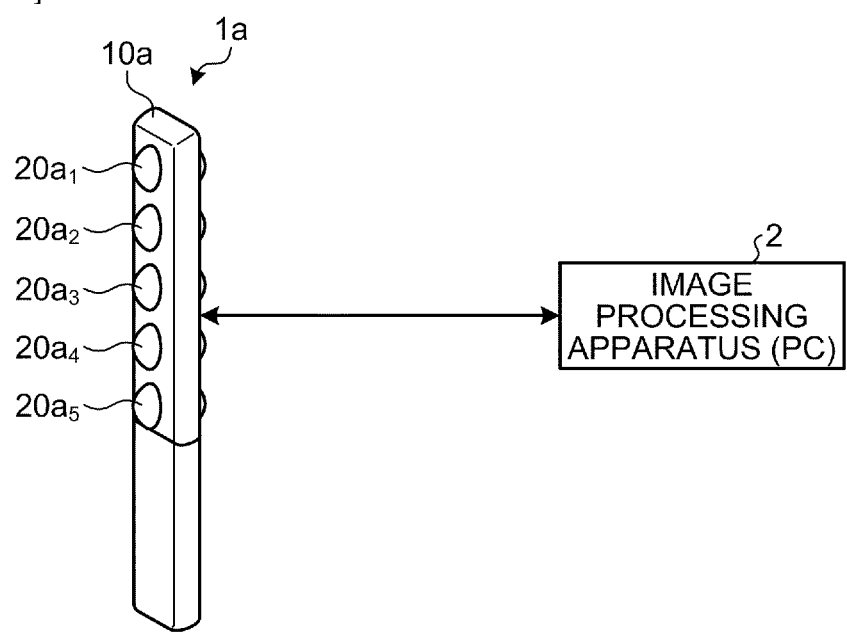

[Fig. 8]
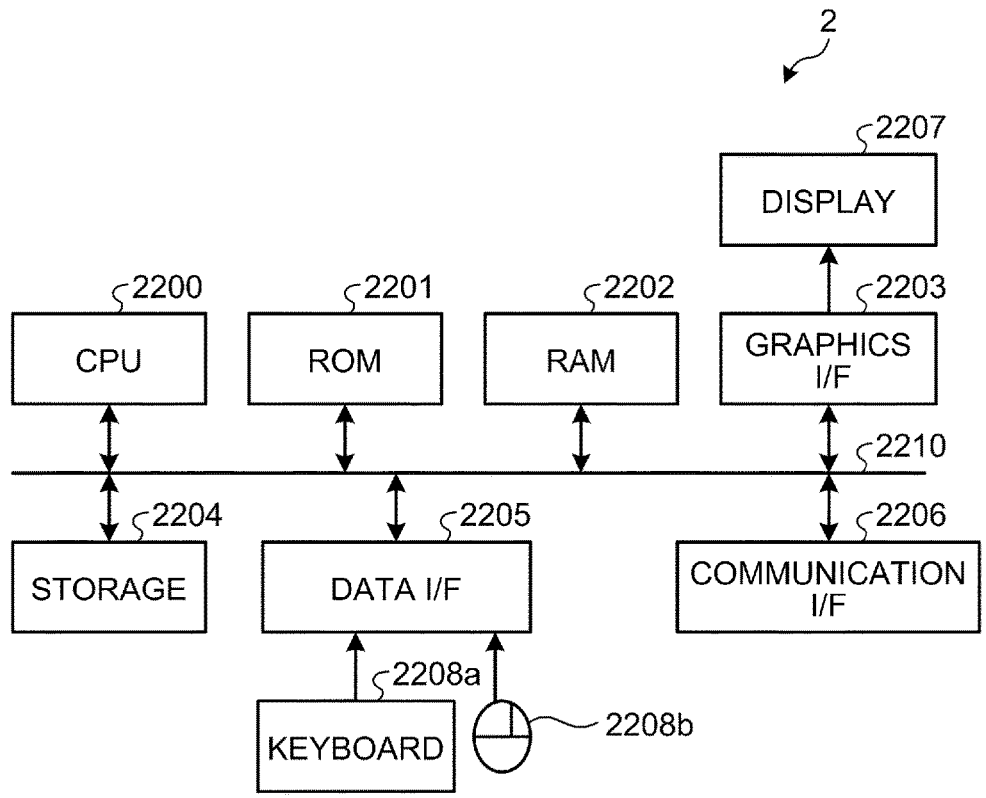
[Fig. 9]
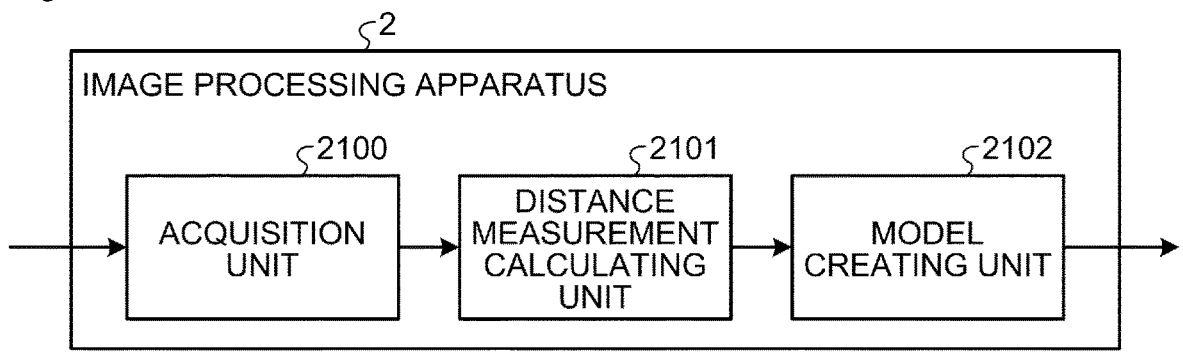

[Fig. 10]
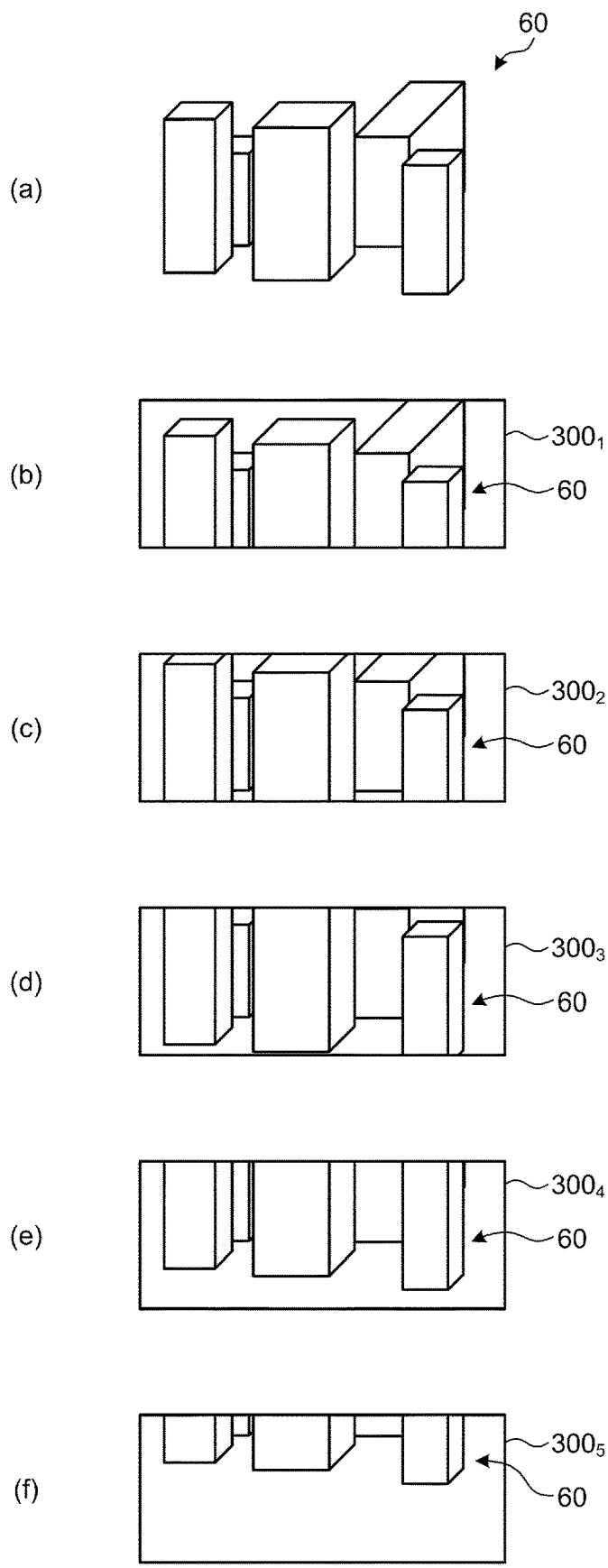

[Fig. 11]
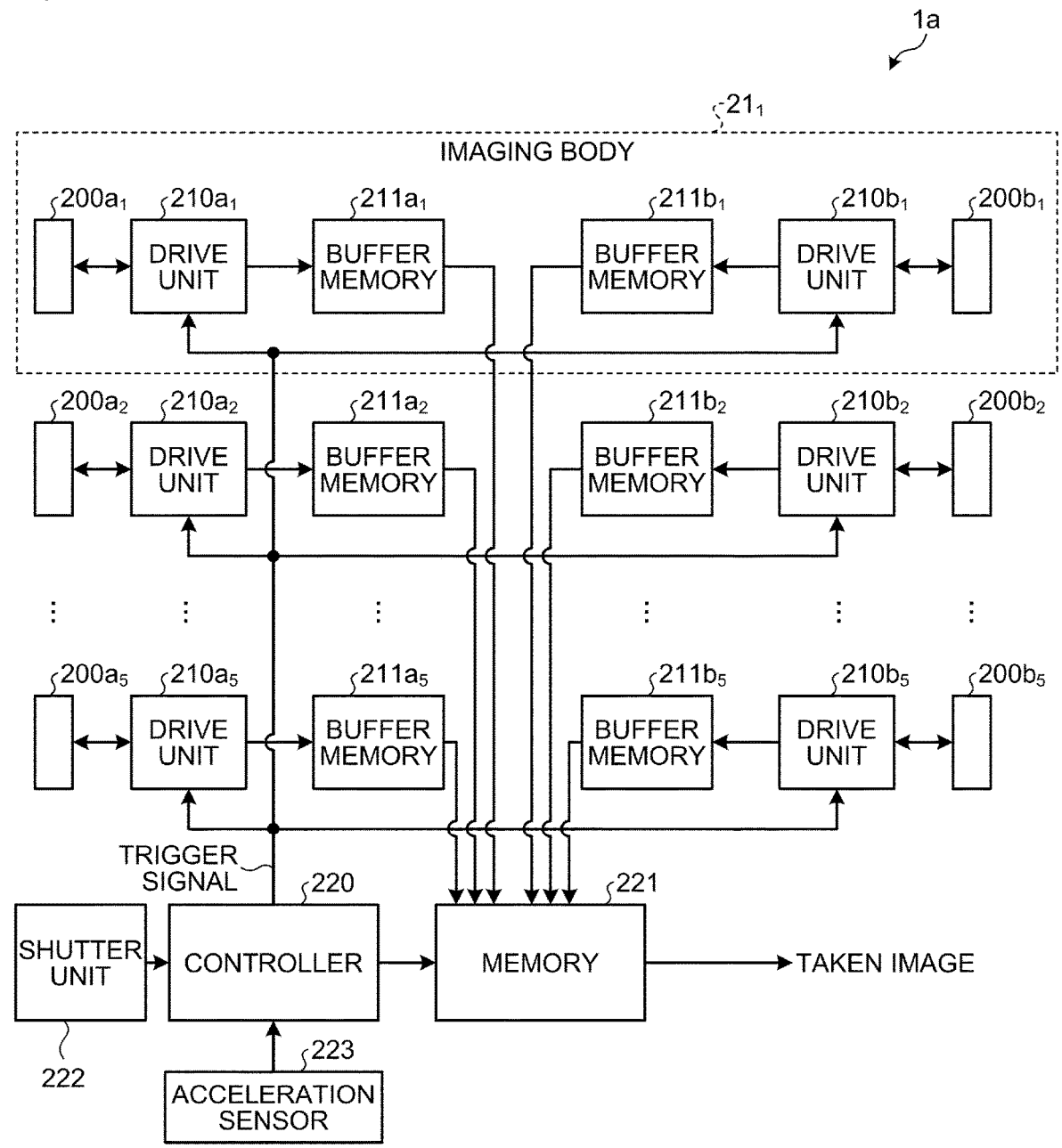

[Fig. 12]
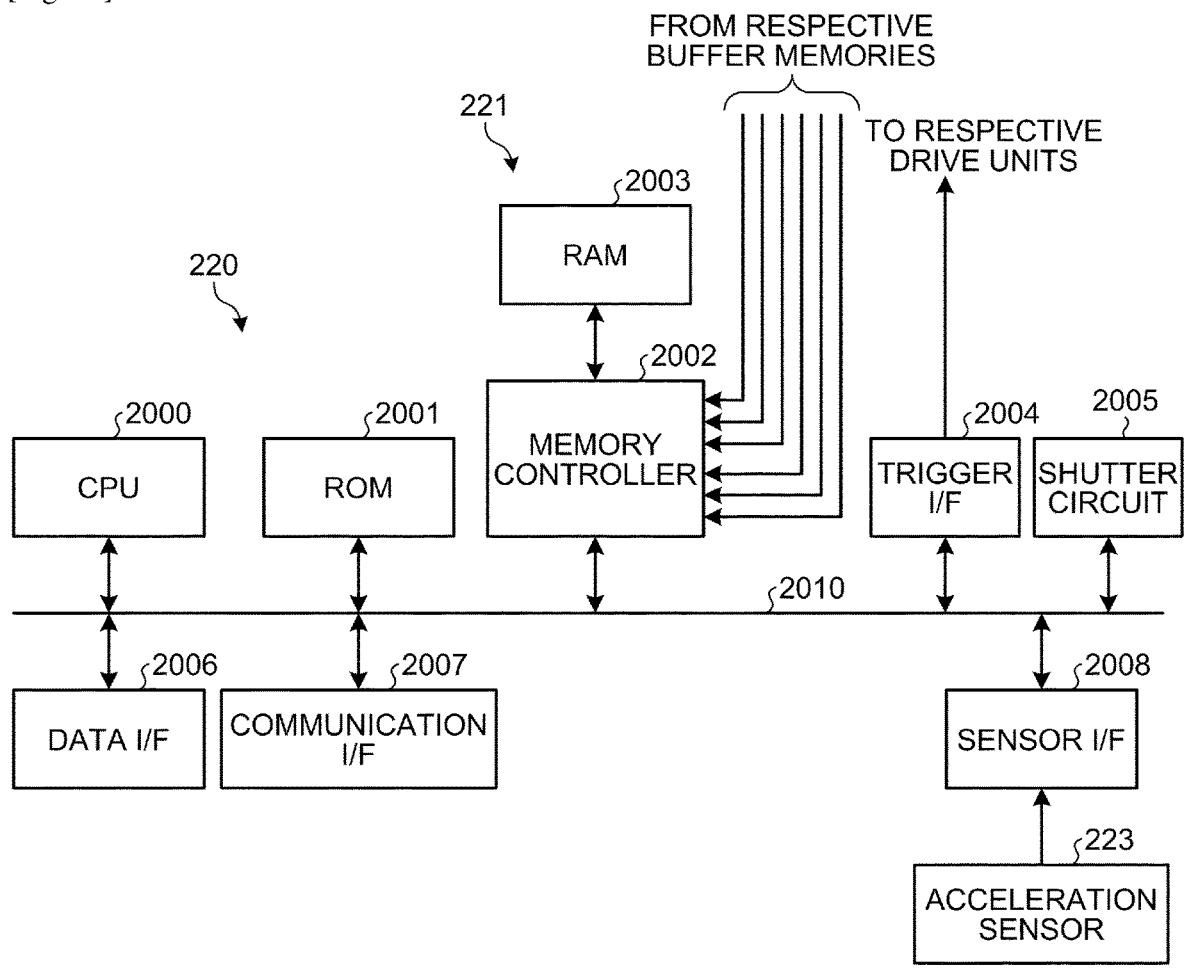

[Fig. 13]
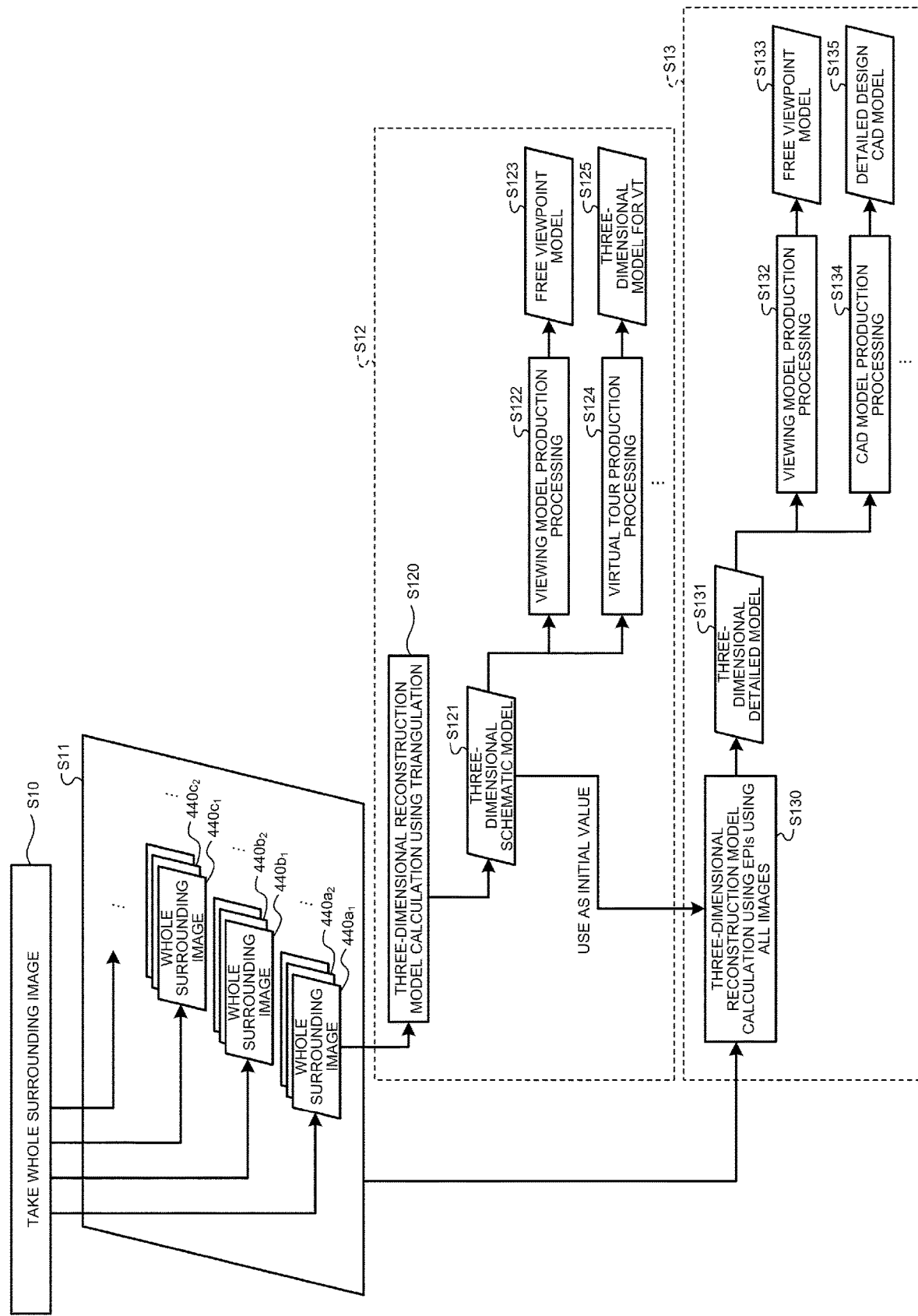

[Fig. 14]
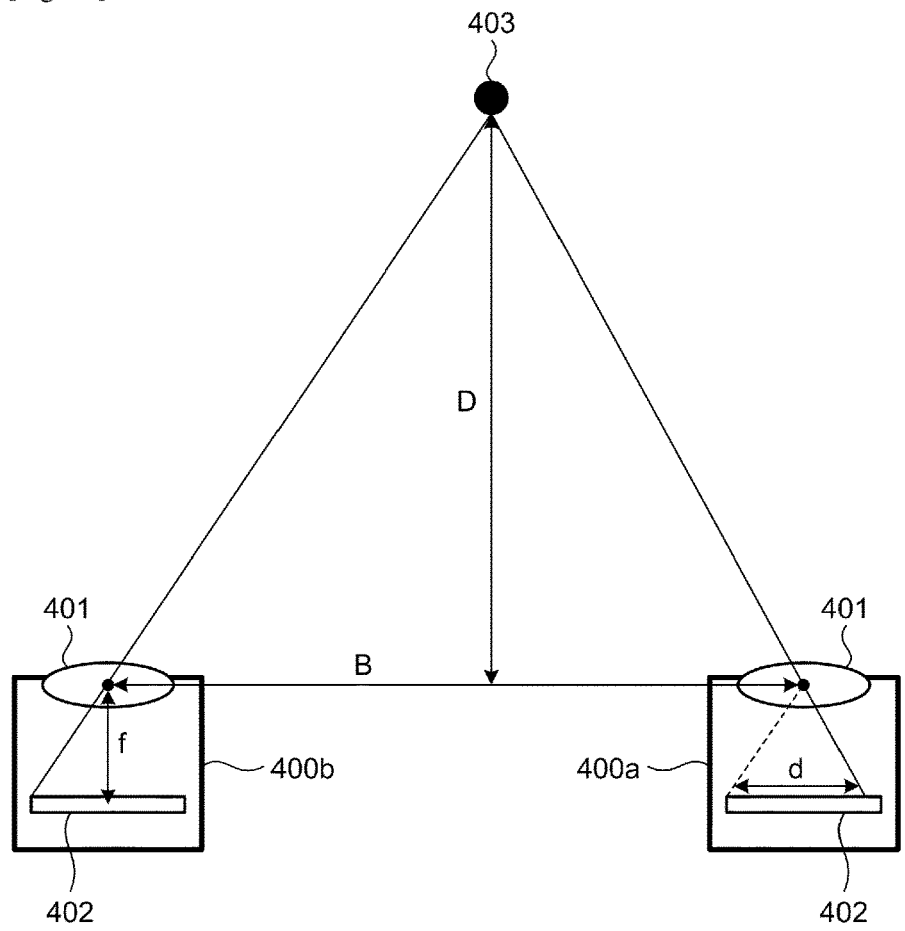
[Fig. 15]
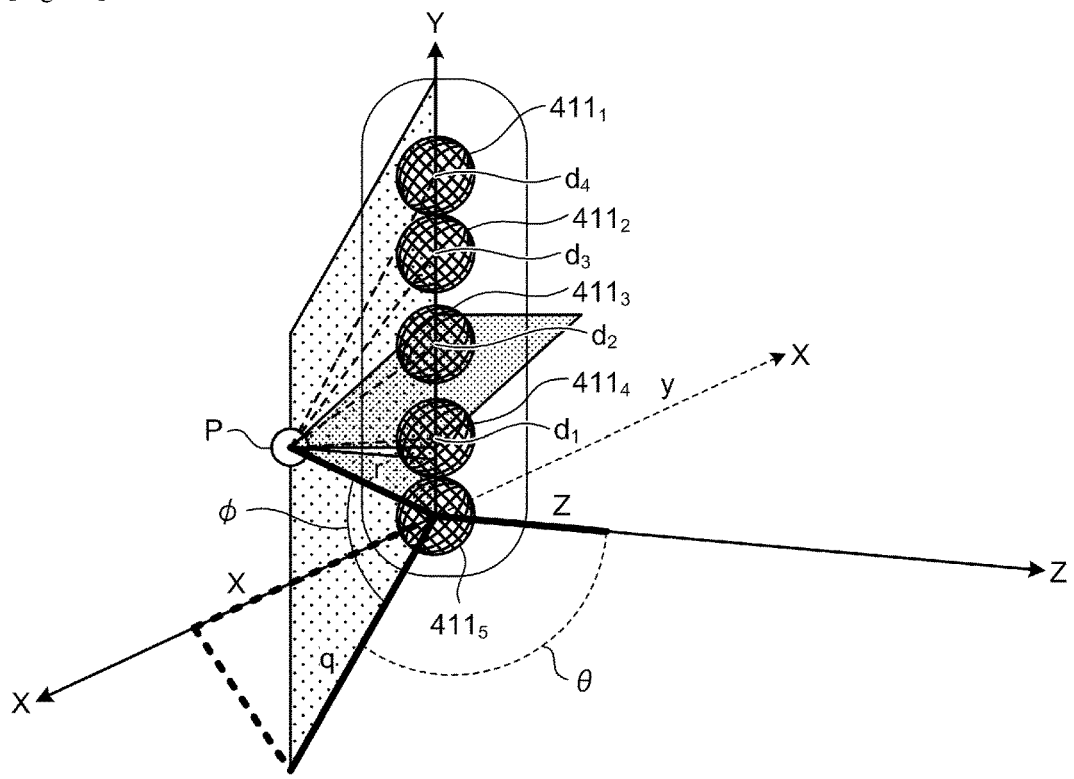

[Fig. 16]
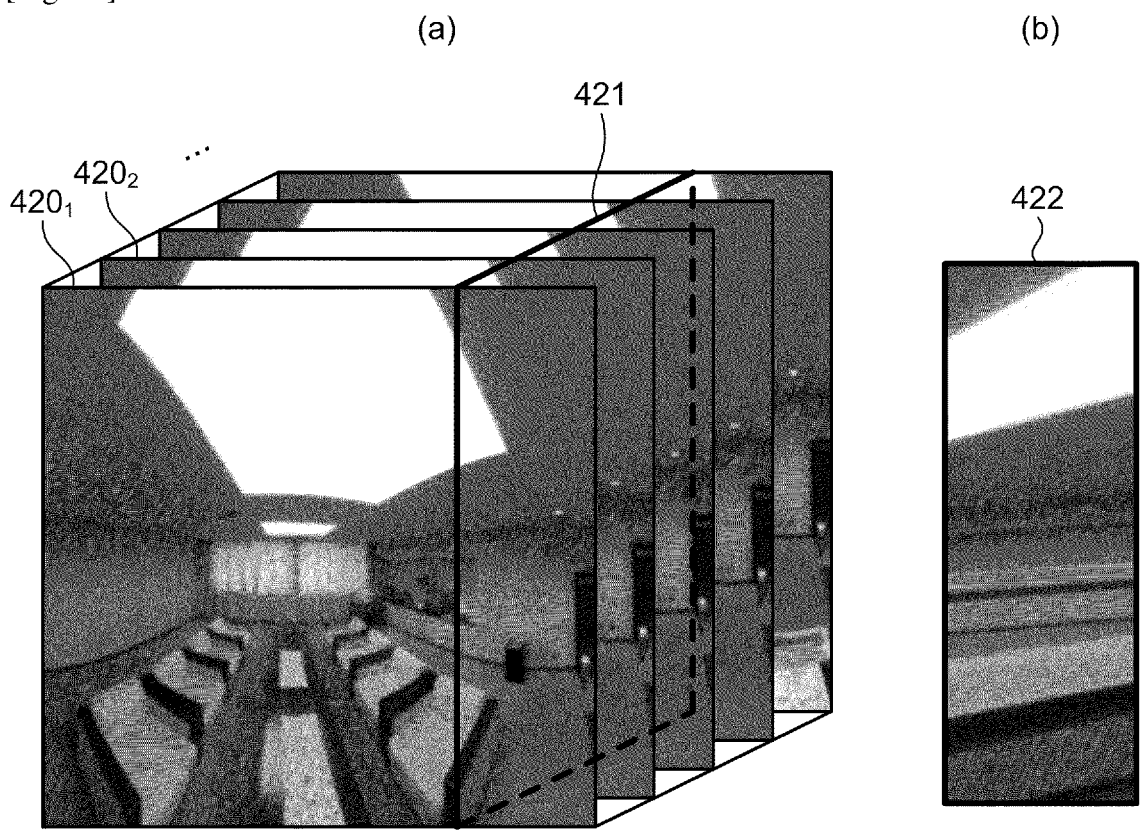
[Fig. 17]
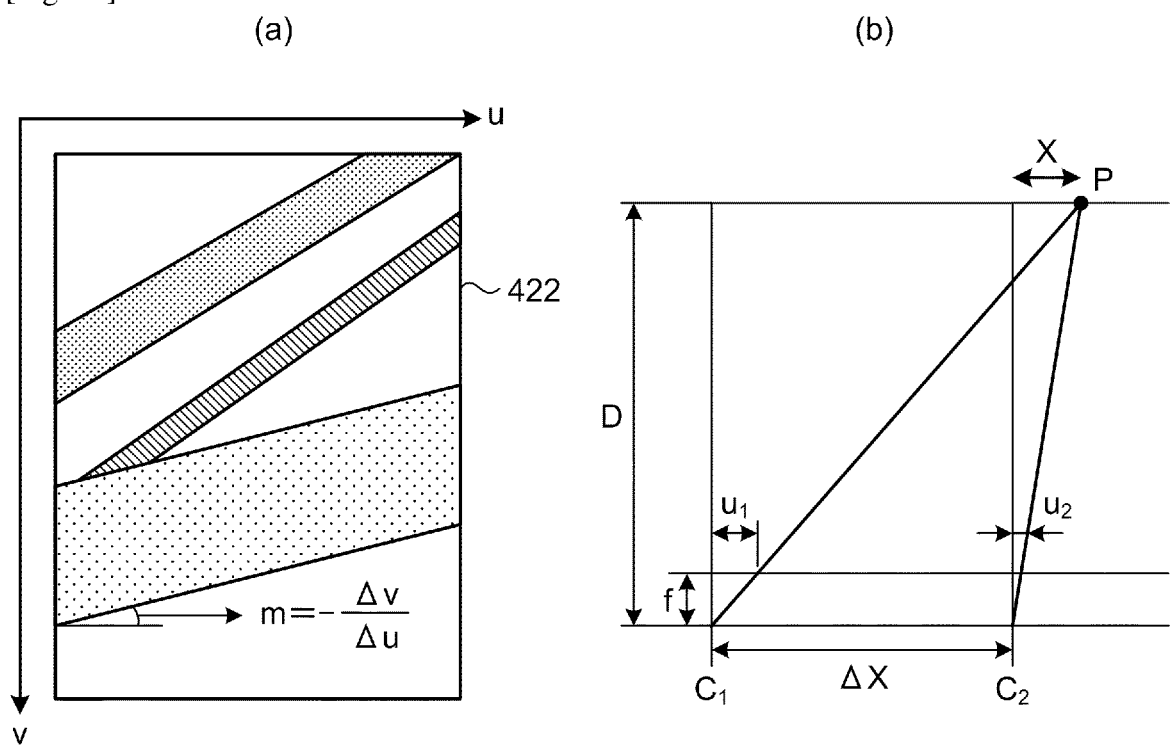

[Fig. 18]
(a) 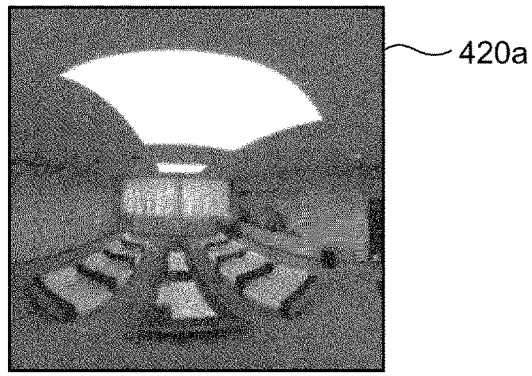
(b) 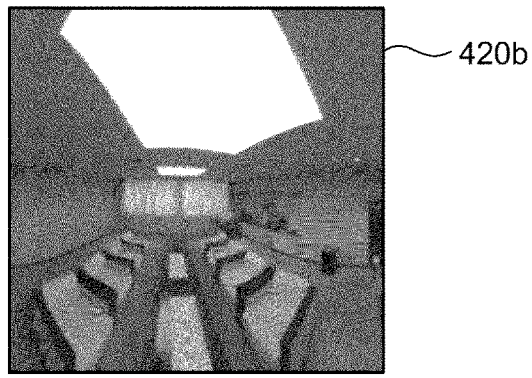
(c) 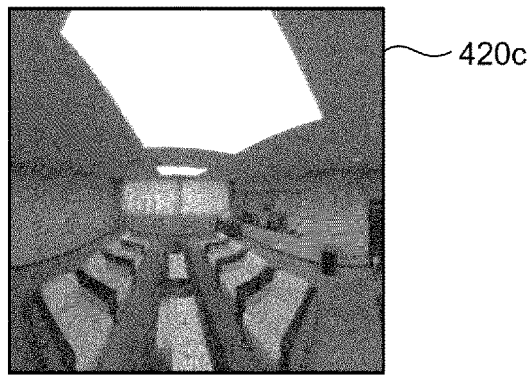
(d) 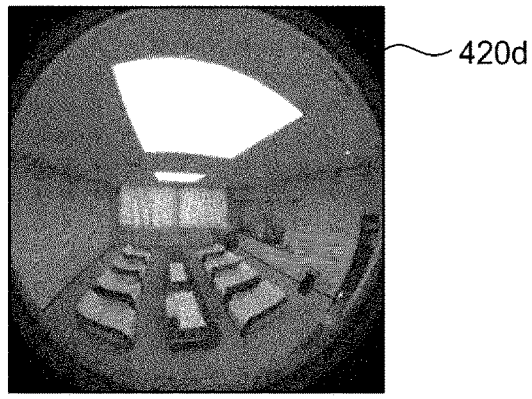

[Fig. 19]
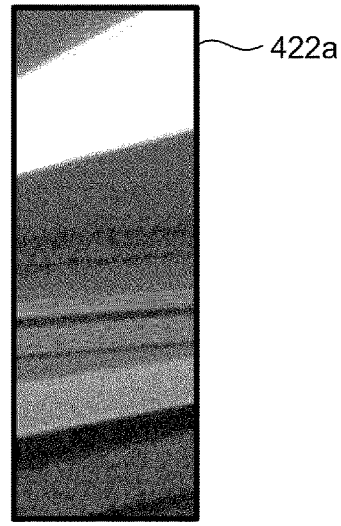
(a)
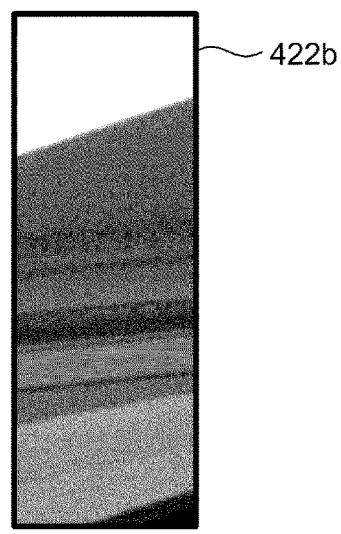
(b)
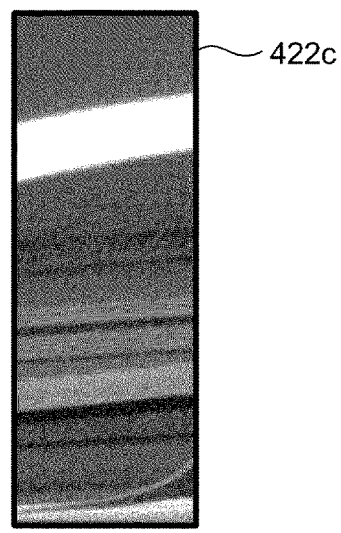
(c)

[Fig. 20]
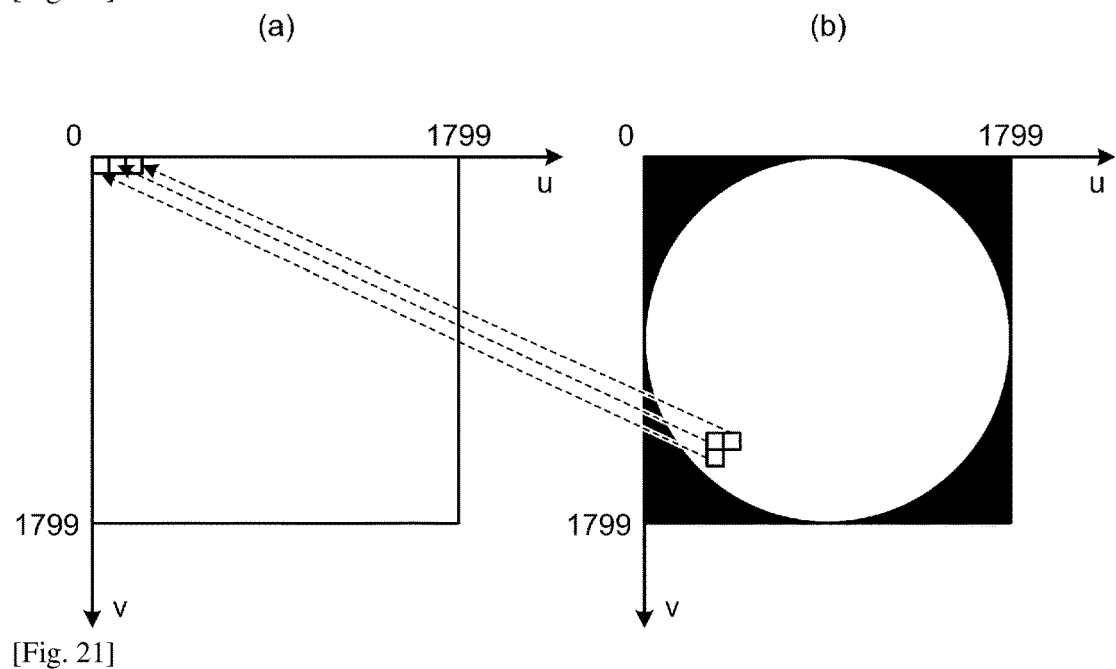
[Fig. 21]
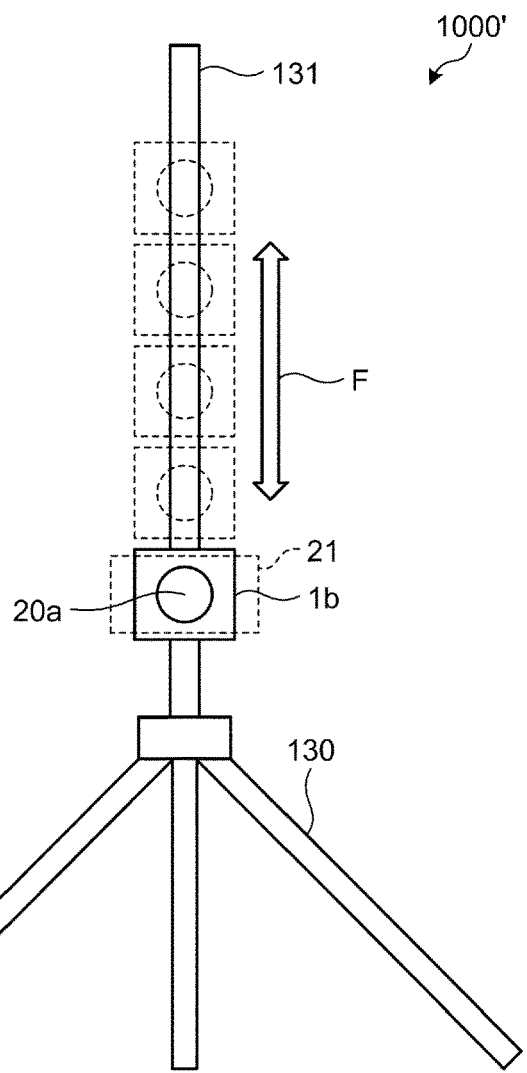

[Fig. 22]
(a) 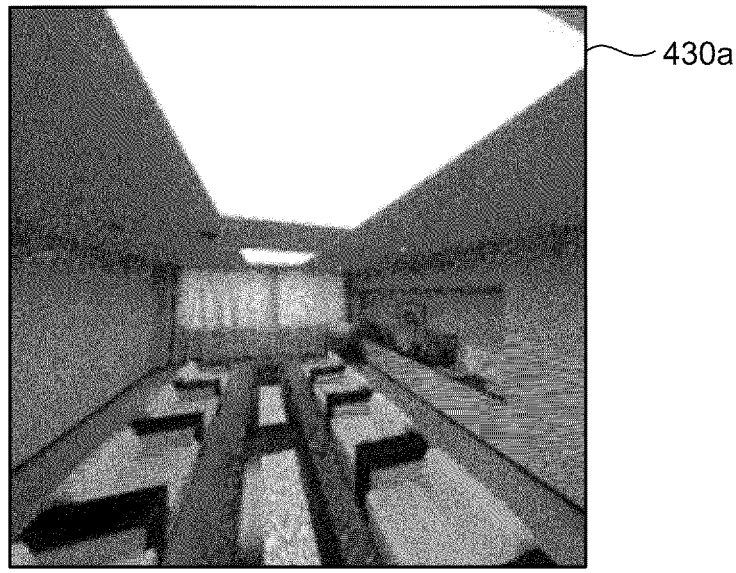
(b) 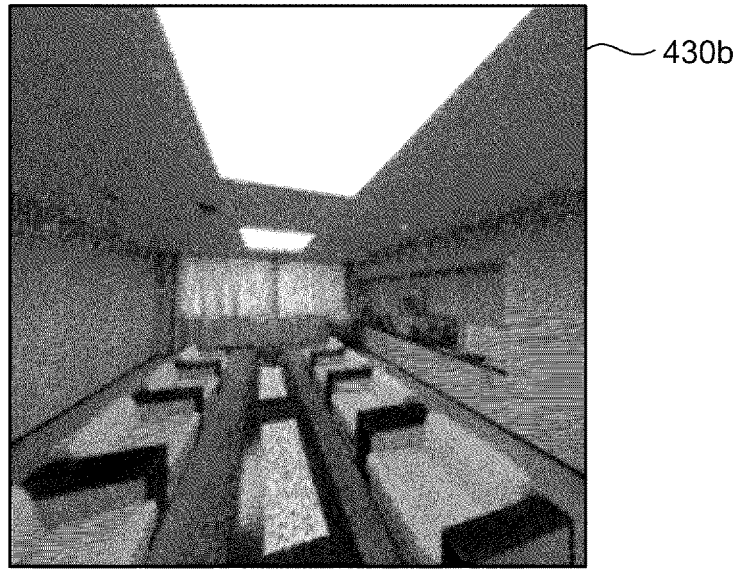

IMAGING SYSTEM WITH MULTIPLE WIDE-ANGLE OPTICAL ELEMENTS ARRANGED ON A STRAIGHT LINE AND MOVABLE ALONG THE STRAIGHT LINE

TECHNICAL FIELD

The present invention relates to an imaging system and a method of imaging control.

BACKGROUND ART

A technique of a three-dimensional reconstruction model is known in which a real object, building, or the entire space containing the real object or building is measured using imaging by a camera, laser beam radiation, or the like, and three-dimensional information is reconstructed as electronic data based on a measurement result. In recent years, the use of the three-dimensional reconstruction model has been studied in various scenes such as bridge inspection or building sites. For example, when a large-scale facility such as a building, is to be built, it may possible to compare a plan designed using computer-aided design (CAD) with a three-dimensional reconstruction model created based on measurement in a building site. In addition, it may be possible to create and apply a three-dimensional reconstruction model to check the conditions during inspections after construction.

Patent Literature 1 discloses a three-dimensional distance measuring sensor that can be applied to acquire three-dimensional reconstruction data, for example. According to Patent Literature 1, three cameras each having fisheye lens characteristics are arranged at three respective viewpoint positions, and a three-dimensional distance is calculated based on images taken by these three cameras.

Patent Literature 2 discloses an imaging system that enables the whole surroundings to be imaged as a full-spherical image by devising lens configuration methods. By acquiring a plurality of taken images at different viewpoints using the imaging system disclosed in Patent Literature 2, it is possible to create a three-dimensional reconstruction model for a relatively wide range.

SUMMARY OF INVENTION

Technical Problem

The three-dimensional reconstruction model is generally created using a plurality of images obtained by taking a target object or space under reconstruction from different viewpoints. Consequently, in order to create a three-dimensional reconstruction model for a large-scale object or space, unfortunately, it is necessary to prepare a large-scale apparatus, and it takes a long time to acquire data.

For example, conventionally, when a three-dimensional reconstruction model for a large-scale facility is to be created, a large-scale laser apparatus and a camera apparatus are used in combination and it takes a few hours to few days to acquire data. Given these circumstances, when the conventional technique is used, it is costly to create a three-dimensional reconstruction model and it is difficult to repeatedly create the three-dimensional reconstruction models for the same target.

The present invention has been made in view of the above, and an object thereof is to easily acquire images used to create a three-dimensional reconstruction model.

Solution to Problem

According to one aspect of the present invention, an imaging system includes a plurality of imaging bodies, a moving part, and an imaging control unit. Each of the imaging bodies includes a first optical element that images a range containing a hemisphere that is centered at an optical axis and oriented in a first direction of the optical axis, and a second optical element that images a range containing a hemisphere that is centered at the optical axis and oriented in a second direction opposite to the first direction. The imaging bodies is arranged in a direction orthogonal to the optical axis. The moving part moves the imaging bodies on a straight line. The imaging control unit is configured to cause the imaging bodies to perform imaging in synchronization with each other, and acquire a taken image from each of the imaging bodies.

Advantageous Effects of Invention

According to one aspect of the present invention, it is possible to easily acquire images used to create a three-dimensional reconstruction model.

BRIEF DESCRIPTION OF DRAWINGS

FIG. 1 is a diagram schematically illustrating an imaging apparatus according to a first embodiment.

FIG. 2 is a diagram of an exemplary structure of an imaging body applicable to the first embodiment.

FIG. 3 is a three-plane drawing schematically illustrating an external view of the imaging apparatus according to the first embodiment.

FIG. 4 is a diagram of an example of an imaging range that can be imaged by the imaging body applicable to the first embodiment.

FIG. 5 is a diagram of an exemplary configuration of an imaging system according to the first embodiment.

FIG. 6 is a diagram of an example of a mechanism that reciprocates a moving part applicable to the first embodiment.

FIG. 7 is a diagram illustrating connection between an image processing apparatus and the imaging apparatus applicable to the first embodiment.

FIG. 8 is a block diagram of an example of a hardware configuration of the image processing apparatus applicable to the embodiment.

FIG. 9 is an exemplary functional block diagram for illustrating functions of the image processing apparatus according to the first embodiment.

FIG. 10 is a diagram schematically illustrating images taken from five different viewpoints and synthesized for each of imaging bodies in the imaging apparatus applicable to the first embodiment.

FIG. 11 is a block diagram of an exemplary configuration of the imaging apparatus according to the first embodiment.

FIG. 12 is a block diagram of an exemplary configuration of a controller and a memory of the imaging apparatus according to the first embodiment.

FIG. 13 is an exemplary flowchart of a three-dimensional reconstruction model creation process applicable to the first embodiment.

FIG. 14 is a diagram for illustrating triangulation applicable to the first embodiment.

FIG. 15 is a diagram representing the position of coordinates of the world coordinate system from a disparity d in a whole surrounding image using equidistant cylindrical projection applicable to the first embodiment.

FIG. 16 is a diagram for illustrating the principle of an EPI applicable to the first embodiment.

FIG. 17 is a diagram for illustrating the principle of the EPI applicable to the first embodiment.

FIG. 18 is a diagram of examples in which different projective transformations have been performed on a whole surrounding image.

FIG. 19 is diagram of examples of EPIs based on respective images obtained by projecting the whole surrounding image by respective methods of projection.

FIG. 20 is a diagram schematically illustrating a method for performing a projective transformation on a whole surrounding image applicable to a second embodiment.

FIG. 21 is a diagram of an example of an imaging system according to a third embodiment.

FIG. 22 is a diagram for illustrating a method for detecting the direction of a straight line as a trajectory of the imaging positions of respective whole surrounding images applicable to the third embodiment.

DESCRIPTION OF EMBODIMENTS

The following describes embodiments of an imaging system and a method of imaging control in detail with reference to the accompanying drawings.

First Embodiment

Imaging Apparatus according to First Embodiment

FIG. 1 schematically illustrates an imaging apparatus according to a first embodiment. In FIG. 1, this imaging apparatus 1a includes a plurality of (five in this example) imaging lenses $20a_1$, $20a_2$, $20a_3$, $20a_4$, and $20a_5$ on a first face of a substantially rectangular parallelepipedal housing 10a. Within the housing 10a, imaging elements are provided corresponding to the respective imaging lens $20a_1$, $20a_2$, ..., and $20a_5$.

Pieces of light made incident on the respective imaging lenses $20a_1$, $20a_2$, ..., and $20a_5$ are emitted to the respective corresponding imaging elements via image-forming optical systems including the respective imaging lenses $20a_1$, $20a_2$, ..., and $20a_5$ provided in the housing 10a. Each of the imaging elements is a charge coupled device (CCD), for example, and is a light-receiving element that converts emitted light into electric charges. The imaging element is not limited to this element and may be a complementary metal oxide semiconductor (CMOS) image sensor.

A plurality of imaging lenses $20b_1$, $20b_2$, $20b_3$, $20b_4$, and $20b_5$ are provided on a second face on the back side of the first face of the housing 10a. Also for these imaging lenses $20b_1$, $20b_2$, ..., $20b_4$, and $20b_5$, respective corresponding imaging elements are provided within the housing 10a similarly to the imaging lens $20a_1$, $20a_2$, ..., and $20a_5$.

Pieces of light made incident on the respective imaging lenses $20b_1$, $20b_2$, ..., $20b_4$, and $20b_5$ are emitted to respective corresponding imaging elements via respective image-forming optical systems including the respective imaging lenses $20b_1$, $20b_2$, ..., $20b_4$, and $20b_5$. The respective imaging elements convert the pieces of emitted light into electric charges.

As described below in detail, respective drive units that drive the respective imaging elements perform shutter control for the respective imaging elements in accordance with trigger signals and read electric charges converted from the respective pieces of light from the respective imaging elements. The respective drive units convert the electric charges read from the respective imaging elements into respective electric signals and convert the respective electric signals into respective taken images as digital data and output the respective taken images. The respective taken images output from the respective drive units are stored in a memory, for example. This operation outputting the taken image based on the piece of light made incident on the imaging lens $20a_1$ in accordance with the trigger signal, for example, will be described as imaging by the imaging lens $20a_1$ or the like for convenience' sake.

When the housing 10a is regarded as a rectangular parallelepiped, faces that are in contact with sides (long sides) along a direction in which the imaging lenses $20a_1$, $20a_2$, ..., and $20a_5$ are arranged in a row are defined as side faces; a face that is in contact with upper edges of the first face, the second face, and the two side faces is defined as an upper face; and a face that is in contact with lower edges of the first face is defined as a bottom face. In the example in FIG. 1, the face that is in contact with the upper edges of the side on which the imaging lenses $20a_1$ and $20b_1$ are arranged serves as the upper face, whereas the face that is opposite to the upper face and that is in contact with the lower edges of the housing 10a serves as the bottom face.

In the first embodiment, the imaging lenses $20a_1$, $20a_2$, ..., and $20a_5$ are arranged at equal intervals of a distance d that is a distance between the adjacent imaging lenses. The imaging lenses $20a_1$ and $20b_1$, the imaging lenses $20a_2$ and $20b_2$, the imaging lenses $20a_3$ and $20b_3$, the imaging lenses $20a_4$ and $20b_4$, and the imaging lenses $20a_5$ and $20b_5$ are arranged on the housing 10a at the same heights from the bottom face of the housing 10a, for example.

Among the imaging lenses $20a_1$, $20a_2$, ..., and $20a_5$ and the imaging lens $20b_1$, $20b_2$, ..., and $20b_5$, a pair of the imaging lenses at the same height from the bottom face of the housing 10a and the image-forming optical systems and the imaging elements corresponding to the pair of the imaging lenses are collectively referred to as an imaging body. In the example in FIG. 1, the pair of the imaging lenses $20a_1$ and $20b_1$, as well as the image-forming optical systems and the imaging elements corresponding to the pair are collectively referred to as an imaging body $21_1$. Similarly, pairs of the imaging lenses $20a_2$, $20a_3$, ..., $20a_5$ and the imaging lenses $20b_2$, $20b_3$, ..., $20b_5$, as well as the image forming optical systems and the imaging elements corresponding to the combinations are collectively referred to as imaging bodies $21_2$, $21_3$, $21_4$, and $21_5$, respectively.

The following describes the structure of the imaging bodies $21_1$, $21_2$, ..., and $21_5$ more specifically. The imaging bodies $21_1$, $21_2$, ..., and $21_5$ can be achieved by the same structure, and the following describes an imaging body 21 on behalf of the imaging bodies $21_1$, $21_2$, ..., and $21_5$.

FIG. 2 illustrates an exemplary structure of the imaging body 21 applicable to the first embodiment. In FIG. 2, the imaging body 21 includes: image-forming optical systems 201a and 201b respectively including imaging lenses 20a and 20b; and imaging elements 200a and 200b each configured by a CCD or CMOS sensor. The image-forming optical systems 201a and 201b are each configured as a six-group seven-lens fisheye lens, for example. This fisheye lens has a total angle of view of 180 degrees (i.e., 360 degrees/n, where n is the number of optical systems, i.e., 2) or more, preferably has an angle of view of 185 degrees or more, and more preferably has an angle of view of 190 degrees or more.

The image-forming optical systems 201a and 201b include prisms 202a and 202b that change optical paths by 90 degrees, respectively. The seven lens elements in six group of the fisheye lenses included in each of the image-forming optical systems 201a and 201b can be classified into an incident side group and an emission side group (the side of the imaging elements 200a and 200b side) by each of the prisms 202a and 202b. For example, light made incident on the imaging lens 20a in the image-forming optical system 201a enters the prism 202a via each of the lenses classified as the incident side group by the prism 202a. An optical path of the light made incident on the prism 202a is changed by 90 degrees, and the light is emitted to the imaging element 200a via each of the lenses classified as the emission side group by the prism 202a and via an aperture stop and a filter.

The optical elements (the lenses, the prisms 202a and 202b, the filters, and the aperture stops) of the two image-forming optical systems 201a and 201b are determined to have positional relation relative to the imaging elements 200a and 200b. More specifically, positioning is performed such that the optical axes of the respective optical elements of the image-forming optical systems 201a and 201b are positioned orthogonal to the respective central portions of the respective light-receiving areas of the corresponding imaging elements 200a and 200b, and that the respective light-receiving areas can serve as the respective image-forming planes of the corresponding fisheye lenses. In the imaging body 21, the image-forming optical systems 201a and 201b have the same specification and are assembled in mutually opposite orientations such that the respective optical axes coincide with each other.

FIG. 3 is a three-plane drawing schematically illustrating an external view of the imaging apparatus 1a according to the first embodiment. (a) of FIG. 3, (b) of FIG. 3, and (c) of FIG. 3 are a top view, a front view, and a side view, respectively, of the imaging apparatus 1a, for example. In (b) of FIG. 3, the imaging lens $20a_5$ is arranged such that its lens center is positioned at a height of h from the bottom face of the housing 10a. With the imaging lens $20a_5$ as a starting point, the imaging lenses $20a_4$, $20a_3$, $20a_2$, and $20a_1$ are arranged at intervals of the distance d from the bottom face side to the upper face side of the housing 10a such that centers of the lenses are aligned with a central line C of the housing 10a in the longitudinal direction.

As illustrated in (c) of FIG. 3, on the back side of the imaging lenses $20a_1$ to $20a_5$, the imaging lenses $20b_1$ to $20b_5$ are arranged at positions corresponding to the imaging lenses $20a_1$ to $20a_5$, respectively. In other words, these imaging lenses $20b_1$ to $20b_5$ are also arranged with their lens centers aligned to the central line C. As described above, among the imaging lenses $20a_1$ to $20a_5$ and the imaging lenses $20b_1$ to $20b_5$, two imaging lenses (the imaging lenses $20a_1$ and $20b_1$, for example) at the same height are included in a single imaging body (the imaging body $21_1$, for example).

In (a) of FIG. 3 and (c) of FIG. 3, the angle α indicates an example of the angle of view (the imaging range) of the imaging lenses $20a_1$ and $20b_1$.

Although the above describes the imaging apparatus 1a including the five imaging bodies $21_1$ to $21_5$, this is not limiting; in other words, the imaging apparatus 1a is only required to include a plurality of imaging bodies 21, may include six or more imaging bodies 21, and may include two or more and four or less imaging bodies 21.

FIG. 4 illustrates an example of an imaging range that can be imaged by each of the imaging bodies $21_1$, $21_2$, ..., $21_5$ applicable to the first embodiment. The imaging bodies $21_1$, $21_2$, ..., $21_5$ have a similar imaging range. FIG. 4 illustrates the imaging range of the imaging body $21_1$ on behalf of the respective imaging ranges by the imaging bodies $21_1$, $21_2$, ..., $21_5$.

In the following, as illustrated in FIG. 4, for example, a direction in which the imaging lenses $20a_1$, $20a_2$, ..., and $20a_5$ are aligned is defined as a Z-axis, and a direction of the respective optical axes of the imaging lenses $20a_1$ and $20b_1$ is defined as an X-axis. In addition, a direction included in a plane orthogonal to the Z-axis and orthogonal to the X-axis is defined as a Y-axis.

The combination of the imaging lenses $20a_1$ and $20b_1$ enables the imaging body $21_1$ to have an imaging range of a full sphere centered at the central portion of the imaging body $21_1$. In other words, as described above, the imaging lenses $20a_1$ and $20b_1$ each have an angle of view of 180 degrees or more and more preferably 185 degrees or more. Consequently, the combination of the imaging lenses $20a_1$ and $20b_1$ enables each of an imaging range R on an XY plane and an imaging range S on an XZ plane to be 360 degrees, and the combination of these imaging ranges achieves the imaging range of the full sphere.

In other words, the imaging body $21_1$ can image a range containing a hemisphere that is centered at the optical axis of the imaging lens $20a_1$ and oriented in a first direction of the optical axis, and a range containing a hemisphere that is centered at the optical axis of the imaging lens $20b_1$ same as the optical axis of the imaging lens $20a_1$ and oriented in a second direction opposite to the first direction.

The imaging bodies $21_1$, $21_2$, ..., and $21_5$ are arranged at intervals of the distance d in a Z-axial direction. Consequently, the respective taken images obtained by imaging the respective imaging ranges of the full sphere by the imaging bodies $21_1$, $21_2$, ..., and $21_5$ are images at different viewpoints that are deviated from each other by the distance d in the Z-axial direction.

In the first embodiment, each of the imaging lenses $20a_1$ to $20a_5$ and each of the imaging lenses $20b_1$ to $20b_5$ perform imaging in synchronization with each other in accordance with a trigger signal, for example. Consequently, with use of the imaging apparatus 1a according to the first embodiment, five taken images that are taken at same timing at different viewpoints that deviated from each other by the distance d in the Z-axial direction are acquired on each of the first face and the second face of the housing 10a.

The five taken images that are taken at same timing at different viewpoints that deviated from each other by the distance d in the Z-axial direction are images arranged on the same epipolar line extending in the Z-axial direction.

FIG. 5 illustrates an exemplary configuration of an imaging system according to the first embodiment. In FIG. 5, parts common to those in FIG. 1 are denoted by the same symbols, and detailed descriptions thereof are omitted. As illustrated in (a) to (c) of FIG. 5, this imaging system 1000 according to the first embodiment includes the imaging apparatus 1a described above and a base 100 including a moving part 110 that is enabled to reciprocate on a straight line. As illustrated by the arrow D in (a) of FIG. 5, the imaging system 1000 according to the first embodiment is formed by joining the moving part 110 and the imaging apparatus 1a via respective corresponding joints 111 and 112. (b) of FIG. 5 illustrates how the imaging apparatus 1a and the moving part 110 are joined to each other.

The joints 111 and 112 are not limited to a particular structure so long as, when the moving part 110 is moved on the straight line with the imaging apparatus 1a joined to the moving part 110 via the joints 111 and 112, the moving part 110 can be inhibited from shaking in a direction different from its moving direction. As an example, with reference to a general mounting part of a tripod and a camera, the joint 111 may be a camera mounting screw, whereas the joints 112 may be a tripod screw hole.

As illustrated by the arrow E in (c) of FIG. 5, the moving part 110 is enabled to reciprocate in a direction in which the imaging lenses $20a_1$, $20a_2$, ..., and $20a_5$ of the imaging apparatus 1a mounted thereon are aligned (the Z-axial direction in FIG. 4). FIG. 6 illustrates an example of a mechanism that reciprocates the moving part 110 applicable to the first embodiment. In the example in FIG. 6, a rack-and-pinion mechanism by a pinion with a motor (M) 120 as a power source and a rack 110a mounted on the moving part 110 reciprocates the moving part 110. Without using the motor 120, the pinion may be manually rotated using a handle or the like to reciprocate the moving part 110.

Imaging is performed while thus reciprocating (displacing upward, for example) the imaging apparatus 1a by the moving part 110, whereby the acquisition of many taken images arranged on the same epipolar line becomes easy.

In this process, as described below, an acceleration sensor is provided in the imaging apparatus 1a, for example, and the position (height) of the imaging apparatus 1a moved on the straight line by the moving part 110 is determined based on the output of the acceleration sensor to acquire the position of the imaging apparatus 1a at the imaging timing of the imaging apparatus 1a. With this, the positional relation among the taken images can be easily determined. Imaging may be performed with the rotation of the motor 120 and the imaging timing of the imaging apparatus 1a synchronized with each other.

Three-Dimensional Reconstruction Model Creation Process According to First Embodiment The following describes an outline of a three-dimensional reconstruction model creation process using a plurality of image at different viewpoints according to the first embodiment. In the embodiment, as illustrated in FIG. 7, for example, the image processing apparatus 2 connected to the imaging apparatus 1a executes the three-dimensional reconstruction model creation process. The image processing apparatus 2 can be configured by executing an image processing program on a personal computer (PC), for example; however, it is not limited to this example. The image processing apparatus 2 may be configured as exclusive hardware for executing the three-dimensional reconstruction model creation process. This image processing apparatus 2 may be included in the imaging system 1000 according to the first embodiment.

FIG. 8 illustrates an example of a hardware configuration of the image processing apparatus 2 applicable to the embodiment. In FIG. 8, the image processing apparatus 2 includes a central processing unit (CPU) 2200, a read only memory (ROM) 2201, a random access memory (RAM) 2202, a graphics interface (I/F) 2203, a storage 2204, a data I/F 2205, and a communication I/F 2206, which are mutually communicably connected to each other via a bus 2210. The image processing apparatus 2 can be thus achieved by a configuration similar to that of general computers.

The storage 2204 is a storage medium that stores therein data in a non-volatile manner, and a hard disk drive or a flash memory can be used therefor. The storage 2204 stores therein computer programs and data for causing the CPU 2200 to operate.

The CPU 2200 uses the RAM 2202 as a work memory in accordance with a computer program stored in advance in the ROM 2201 or the storage 2204, for example, to control the operation of the entire image processing apparatus 2. The graphics I/F 2203 produces a display signal that can be processed by a display 2207 based on a display control signal produced in accordance with a computer program by the CPU 2200. The display 2207 displays a screen responsive to the display signal supplied from the graphics I/F 2203.

The data I/F 2205 transmits and receives data to and from external devices. For the data I/F 2205, Universal Serial Bus (USB) can be used, for example. In this example, a keyboard (KBD) 2208a and a pointing device 2208b as input devices that receive user's input are connected to the data I/F 2205. The imaging apparatus 1a can be further connected to the data I/F 2205. The communication I/F 2206 controls communication with an external network in accordance with instructions of the CPU 2200. The image processing apparatus 2 can also communicate with the imaging apparatus 1a via this communication I/F 2206.

FIG. 9 is an exemplary functional block diagram for illustrating functions of the image processing apparatus 2 according to the first embodiment. In FIG. 9, the image processing apparatus 2 includes an acquisition unit 2100, a distance measurement calculating unit 2101, and a model creating unit 2102. The acquisition unit 2100, the distance measurement calculating unit 2101, and the model creating unit 2102 are formed by an image processing program operating on the CPU 2200. Not limited to this example, part or the whole of the acquisition unit 2100, the distance measurement calculating unit 2101, and the model creating unit 2102 may be formed by hardware circuits that operate in a cooperative manner.

The acquisition unit 2100 acquires taken images from the imaging apparatus 1a. The distance measurement calculating unit 2101 performs distance measurement calculation based on the taken images acquired by the acquisition unit 2100. The model creating unit 2102 creates a three-dimensional reconstruction model using the result of the distance measurement calculation by the distance measurement calculating unit 2101. The distance measurement calculating unit 2101 and the model creating unit 2102 may be altogether regarded as a distance measuring unit.

The image processing program is recorded and provided in a computer-readable recording medium such as a compact disc (CD), a flexible disk (FD), and a digital versatile disc (DVD) as an installable or executable file. Not limited to this example, the image processing program may be stored in a computer connected to a network such as the Internet and provided by being downloaded via the network. The image processing program may be provided or distributed via a network such as the Internet.

The image processing program is modularized including the units described above (the acquisition unit 2100, the distance measurement calculating unit 2101, and the model creating unit 2102). In the actual hardware, the CPU 2200 reads the image processing program from a storage medium such as the storage 2204 and executes the image processing program, whereby the units described above are loaded onto a main storage such as the RAM 2202 to produce the acquisition unit 2100, the distance measurement calculating unit 2101, and the model creating unit 2102 on the main storage.

FIG. 10 conceptually illustrates images taken at five different viewpoints and synthesized for the respective imaging bodies $21_1$, $21_2$, ..., and $21_5$ in the imaging apparatus 1a applicable to the first embodiment. (a) of FIG. 10 illustrates an example of an object 60, and (b) to (f) of FIG. 10 illustrate examples of full-spherical images $300_1$, $300_2$, $300_3$, $300_4$, and $300_5$ obtained by synthesizing taken images of the same object 60 imaged at five different viewpoints. When imaging is performed at the height of the imaging apparatus 1a fixed without moving the moving part 110, as exemplified in (b) to (f) of FIG. 10, each of the full-spherical images $300_1$ to $300_5$ contains an image of the object 60 that is slightly deviated in accordance with the distance d between the imaging bodies $21_1$ to $21_5$.

In contrast, when imaging is performed a plurality of times by the imaging apparatus 1a while moving (displacing upward, for example) the moving part 110, a plurality of sets of the five full-spherical images $300_1$ to $300_5$ described above are acquired deviated by a distance corresponding to the position (height) of the imaging apparatus 1a at each imaging timing.

In FIG. 10, a case is illustrated in which the imaging apparatus 1a images the object 60 that is present on the first face (front face) side of the imaging apparatus 1a for the sake of explanation. However, in reality, the imaging apparatus 1a can image the object 60 that surrounds the imaging apparatus 1a. In this case, the full-spherical images $300_1$ to $300_5$ are images made according to the equidistant cylindrical projection, for example; in each of which the right and left sides represent the same position, and each of the upper side and the bottom side represents the corresponding one point. In other words, the full-spherical images $300_1$ to $300_5$ illustrated in FIG. 10 are images obtained by transforming and partially extracting from images made according to the equidistant cylindrical projection for the sake of explanation.

The projection method of the full-spherical images $300_1$ to $300_5$ is not limited to the equidistant cylindrical projection. The full-spherical images $300_1$ to $300_5$ may be images using cylindrical projection when it is not necessary to set a large angle of view in the Z-axial direction, for example.

Configuration about Signal Processing of Imaging Apparatus According to First Embodiment The following describes a configuration about signal processing of the imaging apparatus 1a according to the first embodiment. FIG. 11 illustrates an exemplary configuration of the imaging apparatus 1a according to the first embodiment. In FIG. 11, parts corresponding to those in FIG. 1 and FIG. 2 are denoted by the same symbols, and detailed descriptions thereof are omitted.

In FIG. 11, the imaging apparatus 1a includes imaging elements $200a_1$, $200a_2$, . . . , and $200a_5$ and imaging elements $200b_1$, $200b_2$, . . . , and $200b_5$, drive units $210a_1$, $210a_2$, . . . , and $210a_5$ and drive units $210b_1$, $210b_2$, . . . , and $210b_5$, and buffer memories $211a_1$, $211a_2$, . . . , and $211a_5$ and buffer memories $211b_1$, $211b_2$, . . . , and $211b_5$.

Among the components described above, the imaging elements $200a_1$, $200a_2$, . . . , and $200a_5$, the drive units $210a_1$, $210a_2$, . . . , and $210a_5$, and the buffer memories $211a_1$, $211a_2$, . . . , and $211a_5$ are components corresponding to the imaging lenses $20a_1$, $20a_2$, . . . , and $20a_5$, and included in the imaging bodies $21_1$, $21_2$, . . . , and $21_5$, respectively. In FIG. 11, only the imaging body $21_1$ among the imaging bodies $21_1$ to $21_5$ is illustrated for the sake of simplicity.

Similarly, the imaging elements $200b_1$, $200b_2$, . . . , and $200b_5$, the drive units $210b_1$, $210b_2$, . . . , and $210b_5$, and the buffer memories $211b_1$, $211b_2$, . . . , and $211b_5$ are components corresponding to the imaging lenses $20b_1$, $20b_2$, . . . , and $20b_5$, respectively, and are included in the imaging bodies $21_1$, $21_2$, . . . , and $21_5$, respectively.

The imaging apparatus 1a further includes a controller 220, a memory 221, a shutter unit 222, and an acceleration sensor 223.

The following describes the imaging body $21_1$. The imaging body $21_1$ includes the imaging element $200a_1$, the drive unit $210a_1$, and the buffer memory $211a_1$, the imaging element $200b_1$, the drive unit $210b_1$, and the buffer memory $211b_1$.

The drive unit $210a_1$ drives the imaging element $200a_1$ and reads an electric charge from the imaging element $200a_1$ in accordance with a trigger signal supplied from the controller 220. The drive unit $210a_1$ converts the electric charges read from the imaging element $200a_1$ into an electric signal, further converts the electric signal into a taken image that is digital data, and outputs the taken image. The drive unit $210a_1$ outputs a taken image of one frame based on the electric charge read from the imaging element $200a_1$ in response to a single trigger signal.

The buffer memory $211a_1$ is a memory that can store therein at least a one-frame taken image. The taken image output from the drive unit $210a_1$ is temporarily stored in this buffer memory $211a_1$.

In the imaging body $21_1$, the imaging element $200b_1$, the drive unit $210b_1$, and the buffer memory $211b_1$ have functions similar to those of the imaging element $200a_1$, the drive unit $210a_1$, and the buffer memory $211a_1$, respectively, and descriptions thereof are omitted here. The other imaging bodies $21_2$ to $21_5$ are similar in function to the imaging body $21_1$, descriptions thereof are omitted here.

The controller 220 controls the operation of the entire imaging apparatus 1a. The controller 220 outputs a trigger signal in accordance with a shutter signal indicating imaging timing supplied from the shutter unit 222. The trigger signal output from the controller 220 is simultaneously supplied to the drive units $210a_1$, $210a_2$, . . . , and $210a_5$ and the drive units $210b_1$, $210b_2$, . . . , and $210b_5$.

The memory 221 reads the respective taken images from the buffer memories $211a_1$, $211a_2$, . . . , and $211a_5$ and the buffer memories $211b_1$, $211b_2$, . . . , and $211b_5$ in accordance with the control of the controller 220 responsive to the output of the trigger signal and stores therein the read taken images. The taken images stored in the memory 221 can be read by the image processing apparatus 2 connected to the imaging apparatus 1a as described with reference to FIG. 5, for example.

The shutter unit 222 outputs the shutter signal in accordance with a control signal received by wired or wireless communication, for example. Not limited to this example, the shutter unit 222 may output shutter signal in accordance with an operation on shutter button provided in the housing 10a. Further, the shutter unit 222 may output the shutter signal at equal temporal intervals by timer control.

The acceleration sensor 223 detects acceleration applied to the imaging apparatus 1a. The acceleration sensor 223 supplies information indicating the detected acceleration to the controller 220. The controller 220 determines the position of the imaging apparatus 1a based on the information indicating the acceleration supplied from the acceleration sensor 223. With a certain position (height) of the moving part 110 as a starting point, the controller 220 determines a height relative to the position as the position of the imaging apparatus 1a, for example.

The controller 220 acquires the position of the imaging apparatus 1a at the timing when the shutter signal has been supplied from the shutter unit 222. The controller 220 stores positional information indicating the acquired position of the imaging apparatus 1a in the memory 221 in association with the respective taken images taken in accordance with the shutter signal.

The controller 220 thus functions as an imaging control unit that causes the imaging bodies $21_1$ to $21_5$ to perform imaging and acquires the taken images thus taken.

FIG. 12 is a block diagram of an exemplary configuration of the controller 220 and the memory 221 of the imaging apparatus 1a according to the first embodiment. In FIG. 12, the controller 220 includes a CPU 2000, a ROM 2001, a trigger I/F 2004, a shutter circuit 2005, a data I/F 2006, a communication I/F 2007, and a sensor I/F 2008, which are communicably connected to a bus 2010. The memory 221 includes a RAM 2003 and a memory controller 2002, and the memory controller 2002 is further connected to the bus 2010.

The CPU 2000 operates with a partial storage area of the RAM 2003 used as a work memory in accordance with a computer program stored in advance in the ROM 2001, for example, to control the operation of the entire imaging apparatus 1a. The memory controller 2002 controls the storage and reading of data in and from the RAM 2003 in accordance with instructions of the CPU 2000. The memory controller 2002 also controls the reading of the taken images from the respective buffer memories $211a_1$, $211a_2$, ..., and $211a_5$ and the respective buffer memories $211b_1$, $211b_2$, ..., and $211b_5$ in accordance with instructions of the CPU 2000.

The shutter circuit 2005 corresponds to the shutter unit 222 described above, produces a shutter signal in accordance with a certain control signal, a shutter button operation, timer control, or the like, and passes the produced shutter signal to the CPU 2000. Upon reception of the shutter signal from the shutter circuit 2005, the CPU 2000 outputs a trigger signal. The trigger signal is output via trigger I/F 2004 and is branched and supplied to each of the drive units $210a_1$, $210a_2$, ..., and $210a_5$ and each of the drive units $210b_1$, $210b_2$, ..., and $210b_5$.

The data I/F 2006 is an interface for performing data communication with external devices. For the data I/F 2006, USB can be used, for example. The communication I/F 2007 is connected to a network and controls communication with the network. The network connected to the communication I/F 2007 may be either a wired network or a wireless network, or the communication I/F 2007 may be connected to both of a wired network and a wireless network. The image processing apparatus 2 is connected to the imaging apparatus 1a via at least either the data I/F 2006 or the communication I/F 2007.

The sensor I/F 2008 is an interface for the acceleration sensor 223, and the output of the acceleration sensor 223 is converted into digital data, for example, by the sensor I/F 2008 to be passed to the CPU 2000.

Although the above describes the CPU 2000 outputting the trigger signal in accordance with the shutter signal output from the shutter circuit 2005, this is not limiting; the CPU 2000 may output the trigger signal in accordance with a signal supplied via the data I/F 2006 or the communication I/F 2007, for example. Further, the trigger I/F 2004 may generate a trigger signal in accordance with a detection result of the shutter circuit 2005 to supply the trigger signal to the drive units $210a_1$, $210a_2$, ..., and $210a_5$ and the drive units $210b_1$, $210b_2$, ..., and $210b_5$.

With this configuration, the controller 220 produces and outputs a trigger signal in response to the shutter signal supplied from the shutter unit 222. The controller 220 acquires the information indicating acceleration output from the acceleration sensor 223 in response to the shutter signal to determine the position (height) of the imaging apparatus 1a.

The trigger signal output from the controller 220 is supplied to each of the drive units $210a_1$, $210a_2$, ..., and $210a_5$ and each of the drive units $210b_1$, $210b_2$, ..., and $210b_5$ at the same timing. Each of the drive units $210a_1$, $210a_2$, ..., and $210a_5$ and the drive units $210b_1$, $210b_2$, ..., and $210b_5$ reads a electric charge from each of the imaging elements $200a_1$, $200a_2$, ..., and $200a_5$ and the imaging elements $200b_1$, $200b_2$, ..., and $200b_5$ in synchronization with the supplied trigger signal.

Each of the drive units $210a_1$, $210a_2$, ..., and $210a_5$ and the drive units $210b_1$, $210b_2$, ..., and $210b_5$ converts the electric charge read from each of the imaging elements $200a_1$, $200a_2$, ..., and $200a_5$ and the imaging elements $200b_1$, $200b_2$, ..., and $200b_5$ into a taken image, and stores the taken image obtained through the conversion in each of the buffer memories $211a_1$, $211a_2$, ..., and $211a_5$ and the buffer memories $211b_1$, $211b_2$, ..., and $211b_5$.

The controller 220 instructs the memory 221 to read the taken image from each of the buffer memories $211a_1$, $211a_2$, ..., and $211a_5$ and each of the buffer memories $211b_1$, $211b_2$, ..., and $211b_5$ at a certain timing after the trigger signal has been output. In the memory 221, the memory controller 2002 in response to this instruction reads the taken image from each of the buffer memories $211a_1$, $211a_2$, ..., and $211a_5$ and each of the buffer memories $211b_1$, $211b_2$, ..., and $211b_5$ and stores each of the read taken images in a certain area of the RAM 2003.

The memory controller 2002 acquires information indicating the position of the imaging apparatus 1a determined based on the output of the acceleration sensor 223 from the controller 220 and stores the information in the RAM 2003 in association with the respective taken images.

When the image processing apparatus 2 is connected to the imaging apparatus 1a via the data I/F 2006, for example, the image processing apparatus 2 issues, via the data I/F 2006, a request to read each of the taken images stored in the RAM 2003. In response to the request, the CPU 2000 instructs the memory controller 2002 to read each of the taken images from the RAM 2003. The memory controller 2002 reads each of the taken images from the RAM 2003 in response to the instruction, and transmits each of the read taken images to the image processing apparatus 2 via the data I/F 2006. The image processing apparatus 2 creates a three-dimensional reconstruction model based on the taken images transmitted from the imaging apparatus 1a.

In the imaging system 1000 according to the first embodiment, imaging is performed while moving the imaging apparatus 1a arranging the imaging bodies $21_1$, $21_2$, ..., and $21_5$ along the Z-axis by the moving part 110 upward, for example. Consequently, all the taken images taken by the imaging apparatus 1a are arranged on the same epipolar line, which can eliminate the need to estimate the position and attitude of the imaging apparatus 1a using structure from motion (SfM) processing or the like and can thus create the three-dimensional reconstruction model with high precision at extremely high speed. When the taken images are not arranged on the same epipolar line, the SfM processing is required.

Processing for Creating Three-Dimensional Reconstruction Model Applicable to First Embodiment FIG. 13 is an exemplary flowchart of the three-dimensional reconstruction model creation process applicable to the first embodiment. In the first embodiment, two methods including a first method and a second method are used to create the three-dimensional reconstruction model.

The first method is a method that creates the three-dimensional reconstruction model using five taken images taken by the respective imaging bodies $21_1$, $21_2$, ..., and $21_5$ at one timing (in a single imaging) by the imaging apparatus 1a. The second method is a method that creates the three-dimensional reconstruction model using a plurality of sets of the taken images taken at a plurality of times while moving the imaging apparatus 1a along the Z-axis using the moving part 110. The three-dimensional reconstruction model is created in a separate manner based on different algorithms by these two methods.

In FIG. 13, at Step S10, the imaging apparatus 1a images a whole surrounding image with a full sphere as an imaging range a plurality of times while moving the imaging apparatus 1a along the Z-axis by the moving part 110. In the image processing apparatus 2, the acquisition unit 2100 acquires a set of whole surrounding images $440a_1$, $440a_2$, ... taken by first-time imaging, a set of whole surrounding images $440b_1$, $440b_2$, ... taken by second-time imaging, and a set of whole surrounding images $440c_1$, $440c_2$, ... taken by third-time imaging from the imaging apparatus 1a, for example (Step S11).

Step S12 illustrates processing performed by the first method, and step S13 illustrates processing performed by the second method, which are executed by the distance measurement calculating unit 2101 and the model creating unit 2102. At Step S12, the distance measurement calculating unit 2101 and the model creating unit 2102 use a set of whole surrounding images obtained in a single imaging (the whole surrounding images $440a_1$, $440a_2$, ..., for example) among the whole surrounding images $440a_1$, $440a_2$, ..., $440b_1$, $440b_2$, ..., and $440c_1$, $440c_2$, ... acquired at Step S11 to create the three-dimensional reconstruction model using a processing algorithm that enables high-speed processing.

At Step S12, the distance measurement calculating unit 2101 determines a distance to an object using triangulation, and the model creating unit 2102 creates the three-dimensional reconstruction model based on this distance, for example (Step S120). The model creating unit 2102 can create a three-dimensional schematic model (a point cloud model) through this three-dimensional reconstruction model calculation at Step S120 (Step S121). Based on this three-dimensional schematic model, the model creating unit 2102 performs viewing model production processing (Step S122) and can thereby produce a free viewpoint model by a mesh model or the like (Step S123). Based on the three-dimensional schematic model produced at Step S121, the model creating unit 2102 performs virtual tour production processing (Step S124) and can thereby produce a three-dimensional reconstruction model for virtual tour (VT) (Step S125).

At Step S13, the distance measurement calculating unit 2101 creates epipolar plane images (EPIs) using all the whole surrounding images $440a_1$, $440a_2$, ..., $440b_1$, $440b_2$, ..., and $440c_1$, $440c_2$, ... acquired at Step S11, and the model creating unit 2102 performs three-dimensional reconstruction model calculation using these EPIs (Step S130). In this process, the model creating unit 2102, for example, uses the three-dimensional schematic model produced at Step S121 as an initial value of the processing at Step S130.

Through this three-dimensional reconstruction model calculation at Step S130, a three-dimensional detailed model (a point cloud model) is created (Step S131). Based on this three-dimensional detailed model, the model creating unit 2102 performs viewing model production processing (Step S132) and can thereby produce a free viewpoint model by a mesh model or the like (Step S133). Based on the three-dimensional detailed model produced at Step S131, the model creating unit 2102 performs computer-aided design (CAD) model production processing (Step S134) and can thereby produce a detailed design CAD model (Step S135).

The following describes the three-dimensional reconstruction model calculation process by triangulation at Step S120 in FIG. 13. FIG. 14 is a diagram for illustrating triangulation applicable to the first embodiment. A purpose of the processing is to calculate a distance D to a target object 403 in the drawing from imaging position information within an image taken by imaging elements 402. The distance D is calculated by the following Expression (1). In Expression (1), the value B is a baseline length between cameras 400a and 400b. The value f is the focal length of a lens 401. The value d represents a disparity.

$$D = \frac{Bf}{d} \quad (1)$$

The Expression (1) is used in a method for calculating the distance D when the two cameras 400a and 400b are used. This method calculates the distance D from respective taken images taken by the two cameras 400a and 400b. In the first embodiment, the method of calculation using the Expression (1) is applied to the whole surrounding images $440a_1$, $440a_2$, ..., for example, taken by the imaging body 21 to calculate the distance D.

When distance calculation is performed by the images using triangulation, the value B and the value f are known, and the calculation of the disparity d is a task of the processing. This disparity d means to detect a point corresponding to the target object 403 imaged within the two cameras; for the detection of this disparity d, various methods of calculation can be used in accordance with uses, including block matching processing by a normalized correlation coefficient (NCC) represented by Expression (2) and high-density disparity calculation process using semi global matching (SGM) as represented by Expression (3) and Expression (4), for example.

$$C_{NCC} = \frac{\sum_{j=0}^{N-1} \sum_{i=0}^{M-1} I(i,j) T(i,j)}{\sqrt{\sum_{j=0}^{N-1} \sum_{i=0}^{M-1} I(i,j)^2 \sum_{j=0}^{N-1} \sum_{i=0}^{M-1} T(i,j)^2}} \quad (2)$$

$$S(p,d) = \sum_r L_r(p,d) \quad (3)$$

$$L_r(p,d) = \hat{c}(p,d) + \min\bigl(L_r(p-r,d), \quad (4)$$
$$L_r(p-r,d-1) + P_1, L_r(p-r,d+1) + P_1, \min_i L_r(p-r,i) + P_2\bigr)$$

The following describes the three-dimensional reconstruction model calculation process using the EPIs at Step S130 in FIG. 13. Examples of a method of image representation for whole surrounding images include methods of image representation by perspective projection, cylindrical projection, and equirectangular projection (equidistant cylindrical projection). In the first embodiment, images represented by equidistant cylindrical projection are used.

FIG. 15 is a diagram representing the position of coordinates (X, Y, Z) of the world coordinate system from the disparity d in a whole surrounding image using equidistant cylindrical projection applicable to the first embodiment. In FIG. 15, the vertical direction in the drawing is the Y-axis. Spheres $411_1$, $411_2$, ... $411_5$ in FIG. 15 represent the respective whole surrounding images taken by a camera (the imaging body 21). The epipolar line is a straight line, and the whole surrounding images as the taken images are arranged in a straight line in the Y direction. With a corresponding point of the lowermost taken image $411_5$ in FIG. 15 as a base, corresponding points with the respective taken images $411_1$, $411_2$, ... are represented by disparities $d_1$, $d_2$, $d_3$, and $d_4$. The disparities $d_1$, $d_2$, $d_3$, and $d_4$ can be determined using various known methods with Expression (2) to Expression (4) described above as examples.

For the calculation of the final disparity d, various methods can be used. A method that assumes a baseline length B of a certain base and uses normalized average can be used, for example. The distances D from the respective disparities $d_1$, $d_2$, $d_3$, and $d_4$ to the respective corresponding points may be calculated and averaged. The distances D are distances placed on the world coordinate system, and the average may be simple average. In addition, without one corresponding point of the whole surrounding image as the base, the disparities d may be calculated for the respective whole surrounding images. In any case, the distance calculation is performed from a plurality of whole surrounding images, whereby the reliability of distance calculation and noise removal for calculating models can be achieved.

Using the following Expression (5) to Expression (11), the coordinates (X, Y, Z) of the world coordinate system is calculated from the disparity d. In Expression (5) to Expression (11), the value d represents the disparity; the value B represents the baseline length; the value f represents the focal length of the camera; the value cellsize represents the size of the imaging element; the value fs represents a focal length for calculation in equidistant cylindrical projection; and (uc, vc) represents the central coordinates of the image.

$$\phi = \frac{(u - uc)}{fs} \tag{5}$$

$$\theta = \frac{(v - vc)}{fs} \tag{6}$$

$$r = \frac{B \times f}{d \times cellsize} \tag{7}$$

$$q = \frac{B}{\left(\tan\left(\phi + \frac{d}{fs}\right) - \tan(\phi)\right)} \tag{8}$$

$$z = q \times \cos(\theta) = z \frac{B \times \cos(\theta)}{\left(\tan\left(\phi + \frac{d}{fs}\right) - \tan(\phi)\right)} \tag{9}$$

$$y = q \times \tan(\phi) = \frac{z}{\cos(\theta)} \times \tan(\phi) \tag{10}$$

$$x = q \times \sin(\theta) = z \times \tan(\theta) \tag{11}$$

When the coordinates (X, Y, Z) of the world coordinate system are calculated, the three-dimensional reconstruction model can be created. The disparity d is calculated, whereby the calculation of the coordinates (X, Y, Z) can be achieved at high speed. For the calculation of this disparity d, the methods shown in Expression (2) to Expression (4) based on triangulation are used, whereby extremely high-speed processing is enabled. Pieces of corresponding point search processing based on triangulation have many methods as stereo disparity calculation, enabling also real-time processing.

By using such simple, high-speed processing-time methods, the three-dimensional reconstruction model can be obtained at extremely high speed from the whole surrounding images taken by the imaging apparatus 1a. The number of the imaging bodies 21 that can be mounted on one imaging apparatus 1a is limited. This means that the baseline length B cannot be made large very much. However, for the measurement of an object at a remote distance, the baseline length B is required to be made large if the focal length f and the imaging elements are fixed.

By using the imaging system 1000 having a structure in which the imaging apparatus 1a is mounted on the moving part 110 according to the first embodiment, many whole surrounding images positioned on the same epipolar line can be easily acquired, and the baseline length B can be made large. Consequently, by using the imaging system 1000 according to the first embodiment, a remote distance can be calculated, and the precision of near distance calculation can also be improved.

Also when imaging of the whole surrounding images is performed while the imaging apparatus 1a is moved along the Z-axis using the moving part 110, the methods by triangulation described above can be used. However, the methods by triangulation perform processing for each of the whole surrounding images, and the processing time exponentially increases. To address this problem, in the first embodiment, which uses many whole surrounding images, the distance D is calculated using a method using the EPIs.

The following describes the principle of the EPI with reference to FIG. 16 and FIG. 17. (a) of FIG. 16 illustrates a set of a plurality of images $420_1$, $420_2$, ..., which are cylindrical images. (b) of FIG. 16 schematically illustrates an EPI 422 obtained by cutting this set of images $420_1$, $420_2$, ... by a plane 421. In the example in (a) of FIG. 16, an imaging position axis of the images $420_1$, $420_2$, ... is taken in the depth direction, and the set of the images $420_1$, $420_2$, ... is overlaid to construct three-dimensional data as illustrated in (a) of FIG. 16. This set of images $420_1$, $420_2$, ... constructed as three-dimensional data is cut by the plane 421 parallel to the depth direction to give the EPI 422 illustrated in (b) of FIG. 16.

FIG. 17 is a diagram of the principle of the EPI applicable to the first embodiment. (a) of FIG. 17 schematically illustrates (b) of FIG. 16. In (a) of FIG. 17, the horizontal axis u is the depth direction in which the images $420_1$, $420_2$, ... are superimposed and represents the disparity, whereas the vertical axis v corresponds to the vertical axes of the images $420_1$, $420_2$, .... The EPI 422 means an image in which the taken images are superimposed in the direction of the baseline length B.

A change in this baseline length B is represented by a distance Δx in (b) of FIG. 17. When the images $420_1$, $420_2$, ... are thus arranged in the direction of the baseline length B, the corresponding positions of the respective images $420_1$, $420_2$, ... are represented by a straight line having a slope of m or a curved line on the EPI 422. This slope m is thus the disparity d to calculate the distance D. The slope m is smaller when the distance D is nearer and is larger when the distance is farther. A straight line having the slope m different in accordance with this distance D or a curved line is called a characteristic point trajectory.

The slope m is represented by the following Expression (12). The distance D is calculated from the slope m by Expression (13). Expression (12) and Expression (13) are computational expressions when the whole surrounding images are taken at a frame rate of f while moving a camera at a constant speed v.

$$m = -\frac{\Delta v}{\Delta u} = \frac{-\Delta v}{-\frac{f\Delta X}{D}} = \frac{-\Delta v}{f\Delta X}D \quad (12)$$

$$D = \frac{f\Delta X}{-\Delta v}m \quad (13)$$

When a whole surrounding image is used as the image forming the EPI, the slope m is a value based on the curved line.

By using the EPI for the creation of the three-dimensional reconstruction model, many whole surrounding images can be processed in a unified manner. By using the slope m, the calculation is made not only for points, and the processing is made robust.

As described with reference to FIG. 13, the first embodiment uses the three-dimensional reconstruction model calculated using triangulation at Step S120 is used as the initial value in order to increase the speed of the calculation of the disparity by the EPI. By using this initial value model, search space of a disparity of each processing coordinate position in the EPI can be limited, and significant speedup in the processing time can be achieved.

There are many demands for the acquisition of data in accordance with season, the time of the year, time, or the like and the analysis and recording of changes in tourist spots, real estate, inspection, or the like, for example. However, large-scale apparatuses and long-term data acquisition have been conventionally required for the creation of three-dimensional reconstruction models, making it difficult to respond to such demands. In contrast, when a three-dimensional reconstruction model of a small-scale object is created, taken images and the SfM technique are generally used.

However, in large-scale space or a situation in which distance range is wide corresponding to tourist spots, real estate, inspection, or the like described above, many taken images are required in view of the restriction of the angle of view and accuracy by SfM. When the processing for creating a three-dimensional reconstruction model is executed for many taken images, much processing time is required, or an environment changes while many taken images are acquired, which may cause the processing not to work well.

As described above, the imaging system according to the first embodiment takes the whole surrounding images using the imaging bodies $21_1$ to $21_5$ while moving the imaging apparatus 1a along the Z-axis by the moving part 110, and many whole surrounding images on the same epipolar line can be acquired easily in a short time. Consequently, only a short time is required for imaging, and even when many taken images are required, changes in an imaging condition caused by environmental changes can be inhibited.

Depending on purpose of using the three-dimensional reconstruction model, the accuracy of the three-dimensional reconstruction model is important, or the appearance is important; thus, demands may vary. In the first embodiment, as described with reference to FIG. 13, the three-dimensional reconstruction model is created by different algorithms for an image group taken by the imaging apparatus 1a in a single imaging and for a whole image group different in a time axis taken using also the moving part 110. Consequently, both the high-speed creation of a schematic model and the creation of a high-precision three-dimensional reconstruction model can be achieved. Further, when the high-precision three-dimensional reconstruction model is created, by using the schematic model is used as an initial model, speedup in the processing can be achieved.

Second Embodiment

The following describes a second embodiment. In the first embodiment, the creation of the three-dimensional reconstruction model using the EPI is performed using the image that is projected according to equidistant cylindrical projection. In contrast, in the second embodiment, the creation of the three-dimensional reconstruction model using the EPI is performed using an image that is projected according to gnomonic cylindrical projection. In the second embodiment, the configuration of the imaging system 1000 described in the first embodiment can be used as it is. The flowchart in FIG. 13 can also be used almost as it is.

FIG. 18 illustrates examples obtained by performing different projective transformations on a whole surrounding image (a fisheye image). (a) of FIG. 18 illustrates an example of an image 420a obtained by performing projection according to gnomonic cylindrical projection used for the second embodiment on the whole surrounding image. The image 420a represents an angle of view of 120 degrees in the vertical direction and an angle of view of 180 degrees in the horizontal direction; although a partial angle of view range at both ends is not contained for the vertical direction, almost all imaging range of the whole surrounding image is contained for the horizontal direction.

(b) of FIG. 18 illustrates an example of an image 420b obtained by performing projection according to central projection on the whole surrounding image. The image 420b has an angle of view of 120 degrees for both the vertical direction and the horizontal direction, showing that a wide-angle area of the whole surrounding image is not contained.

(c) of FIG. 18 illustrates an example of an image 420c obtained by performing projection according to equidistant cylindrical projection on the whole surrounding image. The image 420c represents an angle of view of 180 degrees for both the vertical direction and the horizontal direction, containing almost all imaging range of the whole surrounding image.

The image 420d illustrated in (d) of FIG. 18 is the taken whole surrounding image itself. The images 420a, 420b, and 420c are images transformed from the image 420d.

FIG. 19 illustrates examples of EPIs based on the images 420a, 420b, and 420c obtained by projecting the whole surrounding image using the respective projection methods. (a) of FIG. 19 is an example of an EPI 422a based on the image 420a obtained by performing projection according to gnomonic cylindrical projection; (b) of FIG. 19 is an example of EPI 422b based on the image 420b obtained by performing projection according to central projection; and (c) of FIG. 19 is an example of an EPI 422c based on the image 420c obtained by performing projection according to equidistant cylindrical projection.

Among them, the EPIs 422a and 422b obtained by performing projection according to gnomonic cylindrical projection in (a) of FIG. 19 and central projection in (b) of FIG. 19 each have a characteristic point trajectory being a straight line. In contrast, The EPI 422c based on the image 420c obtained by performing projection according to equidistant cylindrical projection in (c) of FIG. 19 contains a characteristic point trajectory being a curved line.

In the second embodiment, the creation of the three-dimensional reconstruction model is performed using the EPI 422a made according to gnomonic cylindrical projection. Consequently, straight line detection is performed using an algorithm similar to an algorithm used in central projection, so that the distance measurement of a characteristic point is enabled. For the algorithm that creates the three-dimensional reconstruction model from the EPI 422a made according to gnomonic cylindrical projection, a technique described in Non Patent Literature 1 can be used, for example.

At Step S130 of the flowchart in FIG. 13, for example, three-dimensional reconstruction model calculation is performed on all the EPIs 422a created from the whole surrounding images 440a$_1$, 440a$_2$, . . . , 440b$_1$, 440b$_2$, . . . , 440c$_1$, 440c$_2$, . . . acquired at Step S11, and the calculation results are integrated. With this operation, the three-dimensional reconstruction model can be created for the whole surrounding of the imaging apparatus 1a, for example.

FIG. 20 schematically illustrates a method for performing a projective transformation on a whole surrounding image applicable to the second embodiment. (a) of FIG. 20 illustrates an example of the whole surrounding image before projective transformation, whereas (a) of FIG. 20 illustrates an example of an image after projective transformation. (a) and (b) of FIG. 20 are illustrated with u as the horizontal axis and v as the vertical axis. This example describes a case when the maximum size in both the vertical direction and the horizontal direction of the whole surrounding image is 1,800 pixels, and the respective pixels of this whole surrounding image are transformed into the respective pixels of a rectangular image having a size of 1,800 pixels×1,800 pixels.

For a projection method desired to be used in projective transformation, a transformation table illustrated in Table 1 is created in advance, for example. The transformation table associates coordinate values (u', v') for each pixel of an image before transformation with coordinate values (u, v) for each pixel of an image after transformation. For each pixel of the image after transformation, a pixel value at a pixel position of the image before transformation associated by the transformation table is acquired for a pixel position of the image after transformation, and the acquired pixel value is determined to be the pixel value of the pixel at the pixel position of the image after transformation. This processing is executed for all the pixels of the image before transformation, thereby producing the image after transformation.

TABLE 1

| Coordinate values of image after transformation | | Coordinate values of image before transformation | |
|---|---|---|---|
| u | v | u' | v' |
| 0 | 0 | | |
| 1 | 0 | | |
| 2 | 0 | | |
| 1797 | 1799 | | |
| 1798 | 1799 | | |
| 1799 | 1799 | | |

Although the coordinate values (u, v) of the pixel of the image after transformation are represented by values for each pixel, that is, integral values in the example in Table 1, this is not limiting; in other words, the values of the corresponding coordinate values are not limited to integral values and may be represented by decimal values. In that case, the pixel value of the image after transformation may be calculated by interpolation using surrounding pixel values. Bilinear interpolation, cubic interpolation, and the like can be used, for example.

The following describes a method for creating the transformation table in Table 1 corresponding to gnomonic cylindrical projection according to the second embodiment with reference to Expression (14) and Expression (15).

$$x = u - xc \qquad (14)$$
$$y = v - yc$$
$$\phi = \text{Arctan}\left(\frac{y}{f_p}\right)$$
$$\theta = x/f_e$$

$$x = f_f \phi \cdot \cos\theta \qquad (15)$$
$$y = f_f \phi \cdot \sin\theta$$
$$u' = x + xc$$
$$v' = y + yc$$

First, in accordance with Expression (14), the coordinate values (u, v) of the image after transformation are transformed into a direction (θ, φ) of a light beam focused onto the pixel position. In Expression (14), the values xc and yc are the coordinated values of the center of the image after transformation. Next, the direction (θ, φ) is transformed into the coordinate values (u', v') of the image before transformation by Expression (15). In Expression (14) and Expression (15), the values $f_p$, $f_e$, and $f_f$ are parameters of a fisheye lens used for the imaging body 21 that has taken the image before transformation.

This example assumes that the fisheye lens used for the imaging body 21 that has taken the image before transformation is a fisheye lens of the equidistant projection system. The fisheye lens may be of the stereographic projection system, the equi-solidangle projection system, or the like other than the equidistant projection system; a transformation expression can be determined from the design data of the fisheye lens.

The coordinate values (u', v') of the image before transformation corresponding to the coordinate values (u, v) of all the pixels of the image after transformation are determined by the transformation expressions of Expression (14) and Expression (15), whereby the transformation table in Table 1 can be created.

Third Embodiment

The following describes a third embodiment. In the first embodiment and the second embodiment described above, the imaging apparatus 1a includes the imaging bodies 21$_1$ to 21$_5$ in which the imaging lenses 20a$_1$ to 20a$_5$ are aligned and reciprocates along the direction in which the imaging lenses 20a$_1$, 20a$_2$, . . . , to 20a$_5$ are aligned (the Z-axial direction in FIG. 4) by the moving part 110. In contrast, an imaging apparatus according to the third embodiment includes one imaging body 21 and reciprocates this imaging body 21 in one direction.

FIG. 21 illustrates an example of an imaging system according to the third embodiment. In FIG. 21, this imaging system 1000' is formed by mounting an imaging apparatus 1b including the one imaging body 21 on a rail 131 held by a tripod 130, for example, in a movable manner. As described with reference to FIG. 2, the imaging body 21 includes a lens configured similarly to the lens 20a on the back side of the lens 20a, and a combination of the lens 20a and the lens on the back side achieves a full spherical imaging range and can take a whole surrounding image.

The imaging apparatus 1b can perform imaging while being moved as illustrated by the arrow F in the drawing along the rail 131 manually, by motor drive, or the like. The position of the imaging apparatus 1b on the rail 131 at the timing when imaging has been performed is acquired, whereby the taken whole surrounding image and the imaging position can be associated with each other. Imaging is performed a plurality of times by the imaging apparatus 1b while being moved on the rail 131, and a plurality of taken whole surrounding images are used, whereby the three-dimensional reconstruction model can be created similarly to the case when the imaging system 1000 is used.

The following describes a method for detecting the direction of a straight line as a trajectory of the imaging positions of the respective whole surrounding images applicable to the third embodiment with reference to FIG. 22. First, two images obtained by transforming whole surrounding images at both ends among a set of the whole surrounding images using gnomonic cylindrical projection are prepared. These are respective whole surrounding images by the imaging apparatus 1b at a first position and the second position of the rail 131, for example. The prepared images are illustrated as an image 430a in (a) of FIG. 22 and an image 430b in (b) of FIG. 22.

Next, the relative position of the camera (the imaging bodies 21 of the imaging apparatus 1b) at the first and second positions that have taken these images 430a and 430b is determined. For this calculation of the relative position of the camera, a known technique can be used; techniques described in Non Patent Literature 2 and Non Patent Literature 3 can be used, for example.

Specifically, first, characteristic point detection is performed for the images 430a and 430b, and the characteristic quantities of the respective characteristic points are calculated. Next, based on the characteristic quantities of the respective characteristic points, the characteristic points between the images 430a and 430b are associated with each other. Next, from a set of corresponding points, the relative attitude of the camera at the first and second positions is estimated. When the relative attitude of the camera is determined, the direction of the camera at the second position viewed from the camera at the first position is determined, which is a vector indicating the direction of the straight line.

The imaging system 1000' of the third embodiment includes only one imaging body 21 in the imaging apparatus 1b, and the imaging system 1000' can be thus formed at low cost.

Although the embodiments are preferred examples of the present invention, the present invention is not limited to these examples; the present invention can be performed based on various modifications to the extent not departing from the gist of the present invention.

REFERENCE SIGNS LIST 1a, 1b Imaging apparatus
2 Image processing apparatus
10a Housing
21, $21_1$, $21_2$, $21_3$, $21_4$, $21_5$ Imaging body
100 Base
110 Moving part
200a, 200b, $200a_1$, $200a_2$, $200a_5$, $200b_1$, $200b_2$, $200b_5$ Imaging element
$210a_1$, $210a_2$, $210a_5$, $210b_1$, $210b_2$, $210b_5$ Drive unit
$211a_1$, $211a_2$, $211a_5$, $211b_1$, $211b_2$, $211b_5$ Buffer memory
220 Controller
221 Memory
222 Shutter unit
1000, 1000' Imaging system
2100 Acquisition unit
2101 Distance measurement calculating unit
2102 Model creating unit

CITATION LIST

Patent Literature

PTL 1: Japanese Patent No. 5011528
PTL 2: Japanese Unexamined Patent Application Publication No. 2012-277671

Non Patent Literature

NPL 1: C. Kim, H. Zimmer, Y. Pritch, A. Sorkine-Hornung, and M. Gross. Scene reconstruction from high spatio-angular resolution light fields. In SIGGRAPH, 2013

NPL 2: Written by Richard Szeliski, translated by Toru Tamaki, Yoshitoshi Fukushima, Masaaki Iiyama, Akihiko Torii, Takio Kurita, Hitoshi Habe, Masaki Hayashi, and Masafumi Noda, "Konpyuta Bijon—Arugorizumu to Oyo (Computer Vision—Algorithms and Applications)," Kyoritsu Syuppan, Mar. 9, 2013, pp. 177-230 "Dai 4 Sho Tokucyo Kensyutsu to Macchingu (Chapter 4: Character Detection and Matching)," "4.1 Ten to Pacchi (Points and Patches)."

NPL 3: Written by Richard Szeliski, translated by Toru Tamaki, Yoshitoshi Fukushima, Masaaki Iiyama, Akihiko Torii, Takio Kurita, Hitoshi Habe, Masaki Hayashi, and Masafumi Noda, "Konpyuta Bijon—Arugorizumu to Oyo (Computer Vision—Algorithms and Applications)," Kyoritsu Syuppan, Mar. 9, 2013, pp. 267-296 "Dai 6 Sho Tokucyo ni Motozuku Ichiawase (Chapter 6: Alignment Based on Characters)," "6.2 Shisei Suitei (Attitude Estimation)."

The invention claimed is:

1. An imaging system, comprising:
a plurality of imaging bodies, each of the imaging bodies including
a first optical element that images a range containing a hemisphere that is centered at an optical axis and oriented in a first direction of the optical axis, and
a second optical element that images a range containing a hemisphere that is centered at the optical axis and oriented in a second direction opposite to the first direction,
the imaging bodies being arranged in a direction orthogonal to the optical axis;
a moving part that moves the imaging bodies on a straight line;
imaging control circuitry configured to cause the imaging bodies to perform imaging in synchronization with each other, and acquire a taken image from each of the imaging bodies; and
processing circuitry configured to execute
first processing to create a first three-dimensional reconstruction model based on a first algorithm using a plurality of taken images taken by the imaging bodies in a single imaging; and
second processing to create a second three-dimensional reconstruction model based on a second algorithm using (1) a plurality of sets of the taken images taken at a plurality of different positions and a plurality of times by the imaging bodies moved by the moving part, and (2) the first three-dimensional model created based on the plurality of taken images taken in the single imaging.

2. The imaging system according to claim 1, wherein the processing circuitry is further configured to acquire positions of the respective imaging bodies on the straight line in synchronization with the imaging caused by the imaging control circuitry, wherein the imaging control circuitry is further configured to associate the taken images with the positions acquired by the processing circuitry.

3. The imaging system according to claim 1, wherein the processing circuitry is further configured to generate a three-dimensional image by arranging a plurality of taken images taken by the imaging bodies at the plurality of times at the plurality of different positions on the straight line in a moving direction of the imaging bodies that is set as a depth direction, and perform a distance measuring calculation based on an image, the image being generated by cutting the generated three-dimensional image by a plane parallel to the set depth direction.

4. The imaging system according to claim 3, wherein the processing circuitry is further configured to generate the three-dimensional image constituted by converted images obtained by converting the respective taken images using projection according to equidistant cylindrical projection.

5. The imaging system according to claim 3, wherein the processing circuitry is further configured to generate the three-dimensional image constituted by transformed images obtained by transforming the respective taken images using projection according to gnomonic cylindrical projection.

6. The imaging system of claim 1, wherein the processing circuitry is further configured to generate a three-dimensional schematic model in the first processing, and use the generated three-dimensional schematic model as an initial value in the second processing, the second algorithm being different from the first algorithm.

7. An imaging system, comprising:
an imaging body including
a first optical element configured to image a range containing a hemisphere that is centered at an optical axis and oriented in a first direction of the optical axis, and
a second optical element configured to image a range containing a hemisphere that is centered at the optical axis and oriented in a second direction opposite to the first direction;

a moving part that moves the imaging body on a straight line;
imaging control circuitry configured to cause the imaging body to perform imaging, and acquire a taken image; and
processing circuitry configured to execute
first processing to create a first three-dimensional reconstruction model based on a first algorithm using a plurality of taken images taken by the imaging body in a single imaging; and
second processing to create a second three-dimensional reconstruction model based on a second algorithm using (1) a plurality of sets of the taken images taken at a plurality of different positions and a plurality of times by the imaging body moved by the moving part, and (2) the first three-dimensional model created by the first processing.

8. A method of imaging control in an imaging system, the method comprising:
causing a plurality of imaging bodies to perform imaging in synchronization with each other; and
acquiring a taken image from each of the imaging bodies, wherein each of the imaging bodies includes
a first optical element that images a range containing a hemisphere that is centered at an optical axis and oriented in a first direction of the optical axis, and
a second optical element that images a range containing a hemisphere that is centered at the optical axis and oriented in a second direction opposite to the first direction,
the imaging bodies are arranged in a direction orthogonal to the optical axis and mounted on a moving part that moves on a straight line, and
wherein the method further comprises
first processing to create a first three-dimensional reconstruction model based on a first algorithm using a plurality of taken images taken by the imaging bodies in a single imaging; and
second processing to create a second three-dimensional reconstruction model based on a second algorithm using (1) a plurality of sets of the taken images taken at a plurality of different positions and a plurality of times by the imaging bodies moved by the moving part, and (2) the first three-dimensional model created based on the plurality of taken images taken in the single imaging.

* * * * *